(12) United States Patent
Kato et al.

(10) Patent No.: US 7,257,474 B2
(45) Date of Patent: Aug. 14, 2007

(54) STEERING SYSTEM FOR VEHICLE

(75) Inventors: Hiroaki Kato, Hekinan (JP); Shinji Takeuchi, Okazaki (JP); Minekazu Momiyama, Chiryu (JP); Akihiro Ohno, Okazaki (JP); Tsuyoshi Murakami, Handa (JP)

(73) Assignee: JTEKT Corporation, Osaka (JP)

( * ) Notice: Subject to any disclaimer, the term of this patent is extended or adjusted under 35 U.S.C. 154(b) by 170 days.

(21) Appl. No.: 11/097,131

(22) Filed: Apr. 4, 2005

(65) Prior Publication Data
US 2005/0224277 A1 Oct. 13, 2005

(30) Foreign Application Priority Data
Apr. 7, 2004 (JP) ............... 2004-112782

(51) Int. Cl.
B62D 6/00 (2006.01)
B62D 5/00 (2006.01)
B62D 6/04 (2006.01)

(52) U.S. Cl. ........................ 701/41; 180/443

(58) Field of Classification Search ............... None
See application file for complete search history.

(56) References Cited

U.S. PATENT DOCUMENTS

| | | | |
|---|---|---|---|
| 3,908,779 A | | 9/1975 | Inoue |
| 4,658,927 A | * | 4/1987 | Kanazawa ............... 180/422 |
| 5,270,930 A | | 12/1993 | Ito et al. |
| 5,408,411 A | | 4/1995 | Nakamura et al. |
| 5,598,335 A | | 1/1997 | You |
| 6,155,377 A | * | 12/2000 | Tokunaga et al. ......... 180/446 |
| 6,205,374 B1 | | 3/2001 | Kljima et al. |
| 7,073,622 B2 | * | 7/2006 | Turner et al. ............. 180/446 |

FOREIGN PATENT DOCUMENTS

| | | |
|---|---|---|
| EP | 1 355 209 A1 | 10/2003 |
| EP | 1 369 286 A2 | 12/2003 |
| EP | 1 396 372 A2 | 3/2004 |
| EP | 1 508 503 A1 | 2/2005 |
| EP | 1 520 761 A2 | 4/2005 |
| FR | 2 857 912 | 1/2005 |
| JP | 02-227381 | * 9/1990 |

(Continued)

*Primary Examiner*—Michael J. Zanelli
(74) *Attorney, Agent, or Firm*—Oblon, Spivak, McClelland, Maier & Neustadt, P.C.

(57) ABSTRACT

In a steering system 30, a transmission ratio R1 which is determined in dependence on the vehicle speed by reference to a transmission ratio decision map is multiplied with a first transmission ratio alteration gain g10 which is determined in dependence on the distribution of a traveling drive torque from an engine 11 to front wheels 14 and rear wheels 15, thereby to alter the ratio R1 of steering torque distribution from a steering handle 31 to the front wheels 14, whereby the variation of the steering feeling due to an increase or decrease in the distribution of the traveling drive torque to the front wheels 14 can be suppressed. Further, the transmission ratio R1 is multiplied with a second transmission ratio alteration gain g11 which is determined in dependence on the gradient of the road surface by reference to a second transmission ratio alteration map, thereby to alter the transmission ratio R1, whereby the variation of the steering feeling due to the variation of the gradient can also be suppressed.

14 Claims, 13 Drawing Sheets

FOREIGN PATENT DOCUMENTS

| | | | |
|---|---|---|---|
| JP | 04-43165 | * | 2/1992 |
| JP | 2001-253357 | | 9/2001 |
| JP | 3232032 | | 9/2001 |
| JP | 2003-127690 | | 5/2003 |
| WO | WO 03/099636 A1 | | 12/2003 |
| WO | WO 2004/026614 A1 | | 4/2004 |
| WO | WO 2004/101337 A1 | | 11/2004 |
| WO | WO 2005/042294 A1 | | 5/2005 |

* cited by examiner

STEERING SYSTEM FOR VEHICLE

This application is based on and claims priority under 35 U.S.C. 119 with respect to Japanese Application No. 2004-112782 filed on Apr. 7, 2004.

BACKGROUND OF THE INVENTION

1. Field of the Invention

The present invention relates to a steering system capable of altering the mode in which steerable wheels follow to the manipulation of a steering handle, in dependence on the traveling state of a vehicle.

2. Discussion of the Related Art

Heretofore, as steering systems of this kind, there have been known for example, an electric power steering device, (refer to Patent Document 1) capable of altering the assist force for the steering handle manipulation in dependence on the vehicle speed and a variable transmission ratio steering device capable of altering the transmission ratio between a steering handle and steerable wheels in dependence on the vehicle speed (refer to Patent Document 2). Further, there has recently been developed a vehicle capable of switching the vehicle drive mode between a two-wheel drive mode and a four-wheel drive mode in dependence on the traveling state (refer to Patent Document 3), and it may be envisaged that the vehicle of this kind may be provided with a steering system like the aforementioned electric power steering device or the aforementioned variable transmission ratio steering device.

[Patent Document 1]: Japanese unexamined, published patent application No. 2001-253357 (paras. [0008] to [0010])

[Patent Document 2]: Japanese Patent No. 3232032 (paras. [0020] and [0024])

[Patent Document 3]: Japanese unexamined, published patent application No. 2003-127690 (paras. [0002] and FIG. 1)

By the way, where the gradient of the road surface on which a vehicle is traveling varies or where the drive mode is altered between the two-wheel drive mode and the four-wheel drive mode, a variation is also made in a friction resistance that the steerable wheels receive from the road surface by being steered. However, in the prior art steering system, steering controls are not performed to cope with changes in the road surface as well as the drive mode. Therefore, where the gradient of the road surface or the drive mode varies, it may be the case that variations take place in the steering resistance the driver receives on a steering handle as well as in the responsiveness of the vehicle turn to the steering manipulation, so that a strange feeling in steering may be given to the driver.

SUMMARY OF THE INVENTION

Accordingly, it is a primary object of the present invention to provide an improved steering system capable of keeping the steering feeling in a stable state.

Briefly, according to the present invention, there is provided a steering system wherein the transmission ratio of motion between a steering handle and steerable wheels is varied in dependence on the traveling state of a vehicle. The steering system comprises a steering mechanical train for transmitting the motion of the steering handle to the steerable wheels at a variable transmission ratio, and judgment means for judging whether the vehicle is in ascent traveling, descent traveling or horizontal traveling. The steering system further comprises transmission ratio alteration means for altering the transmission ratio so that when the vehicle is judged by the judgment means to be in ascent traveling, the steering manipulation amount necessary to steer the steerable wheels is decreased compared with that in horizontal traveling and so that when the vehicle is judged by the judgment means to be in descent traveling, the steering manipulation amount necessary to steer the steerable wheels is increased compared with that in horizontal traveling.

With this configuration, when the vehicle gets into ascent traveling, the load onto rear wheels (non-steerable wheels) increases, while the load onto front wheels (steerable wheels) decreases. Thus, the steering resistance which the steerable wheels receive from the load surface lowers compared with that in horizontal traveling. To cope with this, the transmission ratio of the steering mechanical train is altered to decrease the manipulation amount of the steering handle necessary to steer the steerable wheels compared with that in horizontal traveling. As a result, the steering resistance becomes liable to be transmitted to the steering handle, and the variation of the steering feeling can be suppressed. On the other hand, when the vehicle gets into descent traveling, the load onto the front wheels (steerable wheels) increases, and the steering resistance increases compared with that in the horizontal traveling. To cope this, the transmission ratio of the steering mechanical train in the descent traveling is altered to increase the manipulation amount of the steering handle necessary to steer the steerable wheels compared with that in horizontal traveling. Thus, the steering resistance becomes hard to be transmitted to the steering handle, and the variation of the steering feeling can be suppressed. In this way, the steering feeling given to the driver can be made to be stable.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
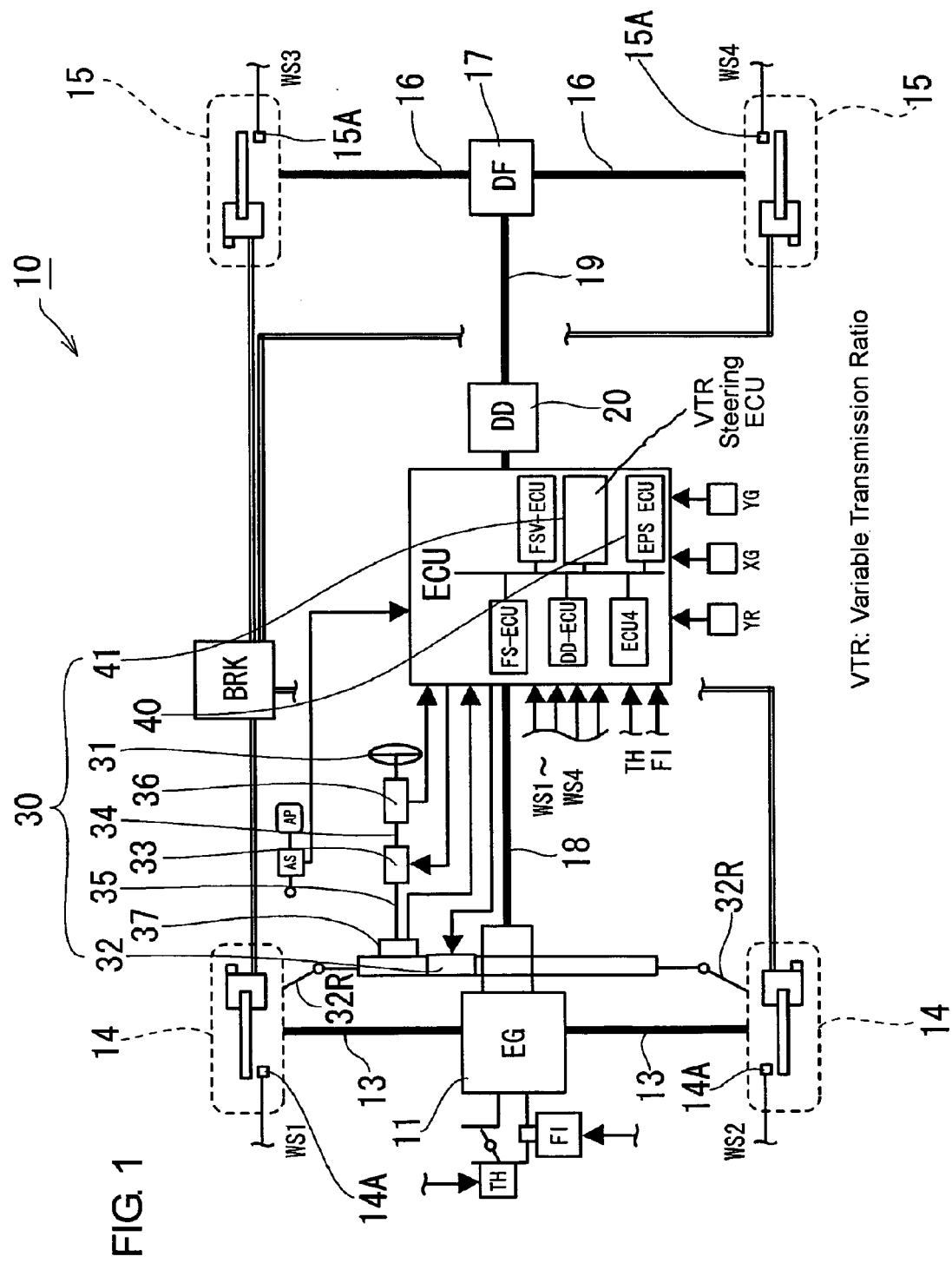
FIG. 1 is a conceptual schematic view of a steering system in one embodiment according to the present invention.

A first embodiment of the present invention will be described with reference to FIGS. 1 to 13. FIG. 1 shows main components included in a steering mechanical train 32-37 and a traveling drive train 11, 17-20 of a vehicle 10 incorporating a steering system 30 according to the present invention. First of all, the construction of the traveling drive train 11, 17-20 will be described. The vehicle 10 has an engine 11 mounted on the front side (left side as shown in FIG. 1). A transaxle (not shown) integrated with the engine 11 is provided with a transmission, a transfer and a front differential, and the drive power of the engine 11 is transmitted to front drive shafts 13, 13 through the transmission and the front differential, so that front wheels 14, 14 are driven which correspond to steerable wheels in the present invention.

The transfer of the transaxle has coupled thereto a front end portion of a front propeller shaft 18. A rear end portion of the front propeller shaft 18 is coupled to a front end portion of a rear propeller shaft 19 with a torque transmission device 20 interposed therebetween. Further, a rear end portion of the rear propeller shaft 19 is coupled to a rear differential 17, and rear wheels 15 and 15 corresponding to non-steerable wheels in the present invention are attached to extreme ends of rear wheel drive shafts 16 and 16 which extend from the rear differential 17 in right and left directions.

In the torque transmission device 20, an input section is constituted at a portion coupled to the front propeller shaft 18, and an output section is constituted at a portion coupled to the rear propeller shaft 19. A clutch mechanism is provided between the input section and the output section. Thus, the torque transmission device 20 is able to change or alter the distribution of traveling drive torques which are transmitted from the engine 11 to the front wheels 14 and the rear wheels 15.

Figure 3:
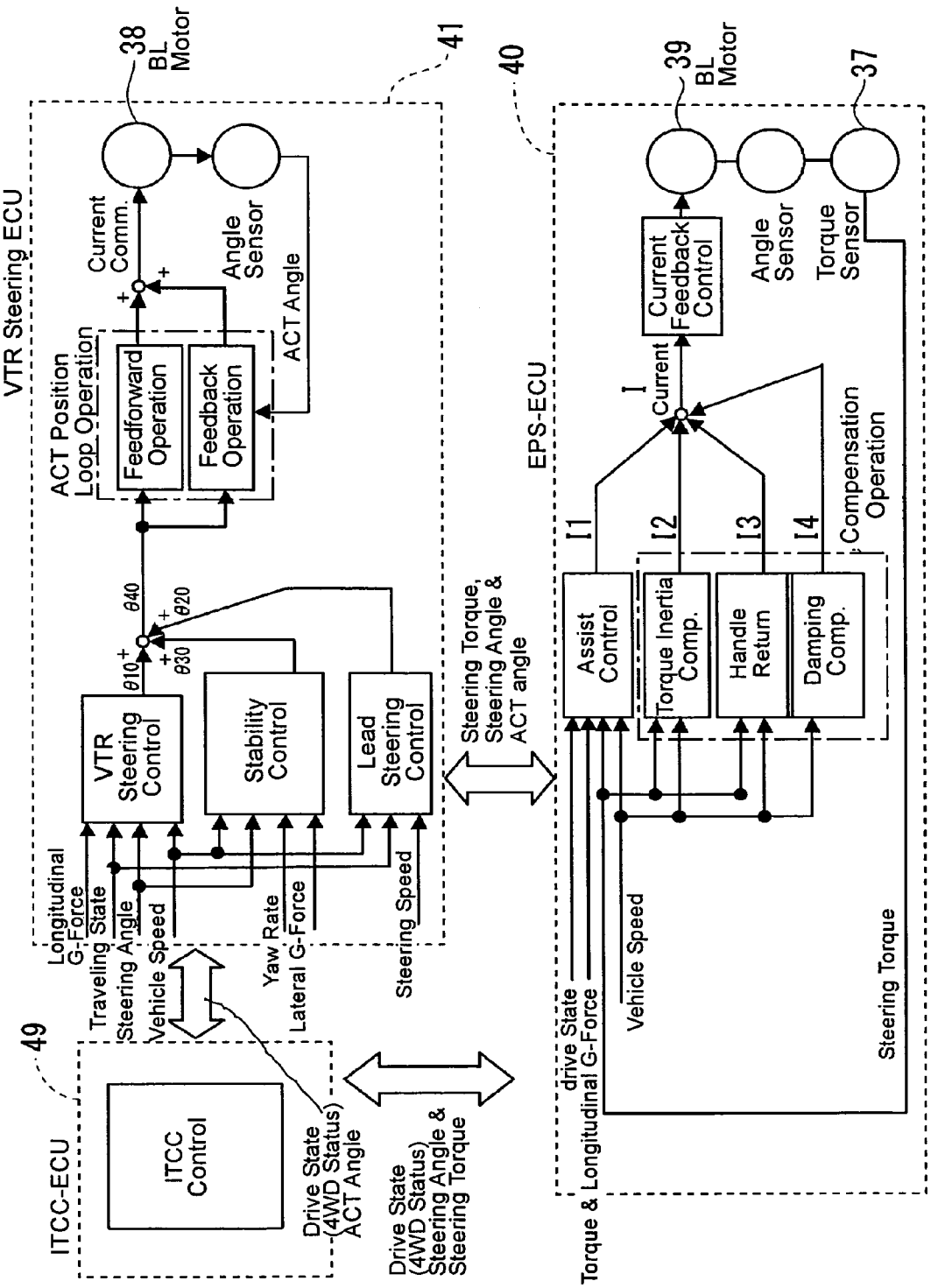
FIG. 3 is a block diagram representing the control operations executed by respective CPUs provided in a vehicle.

The torque transmission device 20 is controllable in dependence on a 4WD status determined by an ITCC-ECU (Electronic Control Unit for Intelligent Torque Control Coupling) 49 shown in FIG. 3. The 4WD status is data pertaining to the distribution of the traveling drive torques which are transmitted from the engine 11 to the front wheels 14 and the rear wheels 15. The 4WD status has been set so that for example, the torque distributions to the front wheels 14 and the rear wheels 15 become 100:0 during an ordinary traveling in which the vehicle travels straight ahead at a constant speed. Thus, the torque transmission device 20 (to be more exact, a clutch mechanism) is brought into an uncoupled state in dependence on the 4WD status, whereby the torque distribution from the engine 11 to the front wheels 14 becomes a hundred (100) percents, whereas the torque distribution to the engine 11 to the rear wheels 15 becomes zero (0) percent. That is, the drive mode is switched to the two-wheel drive mode in which the front wheels 14 only are driven.

Further, in an occasion wherein the slip of the front wheels 14 is detected or the like, the ITCC-ECU 49 alters the 4WD status from a ratio of 100:0 to another ratio of 50:50. Then, in dependence on the 4WD status, the torque transmission device 20 is brought into a so-called "half clutch state" or "full coupling state". Thus, the traveling drive torque from the engine 11 is transmitted also to the rear wheels 15, and when the transmission device 20 is brought into the full coupling state, the torque transmission distributions from the engine 11 to the front wheels 14 and the rear wheels 15 become the ratio of 05:50, whereby the drive mode is switched to a full four-wheel drive state.

Next, the construction of the steering mechanical train 32-37 will be described. The steering system 30 in the present embodiment is provided with an electric power steering device 32, an actuator 33 for the variable transmission ratio steering system, and an EPS-ECU (Electronic Control Unit for Electric Power Steering) 40 and a variable transmission ratio steering ECU (Electronic Control Unit) 41 for controlling these devices 32 and 33.

The actuator 33 for the variable transmission ratio steering system is composed of a servomotor 38 (refer to FIG. 3) and a reduction unit (not shown). Specifically, a stator of the servomotor 38 and a body of the reduction unit are integrated to constitute an input section of the actuator 33, whereas a rotor of the servomotor 38 and an input rotational section of the reduction unit are integrated to constitute an output section of the actuator 33. The input section of the actuator 33 has coupled thereto an input steering shaft 34 rotatable bodily with a steering handle 31. Further, the output section of the actuator 33 has coupled thereto an output steering shaft 35, whose extreme end is coupled to an input pinion gear of the electric power steering device 32.

The stator and the rotor of the servomotor 38 are relatively rotated upon manipulation of the steering handle 31 to make the output section of the actuator 33 rotate relative to the input section of the same. Then, the angle which is made by adding the relative rotational amount (hereafter referred to as "ACT angle") of the actuator 33 to the rotational angle of the steering handle 31 is given to the input pinion gear (not shown) of the electric power steering device 32.

A steering angle sensor 36 for detecting the steering angle of the steering handle 31 is provided at an intermediate portion of the input steering shaft 34. Further, a steering torque sensor 37 for detecting a steering torque applied to the steering handle 31 is provided at an extreme end portion of the output steering shaft 35. The aforementioned input pinion gear is rotatably provided to pass through a center axis portion of the torque sensor 37.

The electric power steering device 32 is provided with a rack (not shown) extending in the transverse (i.e., left-right) direction of the vehicle 10. Tie rods 32R and 32R extending from opposite ends of the rack are coupled respectively to the front wheels 14 and 14. The electric power steering device 32 is further provided with a servomotor 39 (refer to FIG. 3) whose center permits the rack to pass therethrough, and a rotor of the servomotor 39 and the rack are drivingly connected with each other through a ball screw mechanism (not shown). With this construction, the force which is required to manipulate the steering handle 31 in steering the front wheels 14 and 14 is assisted by the power of the servomotor 39.

Figure 2:
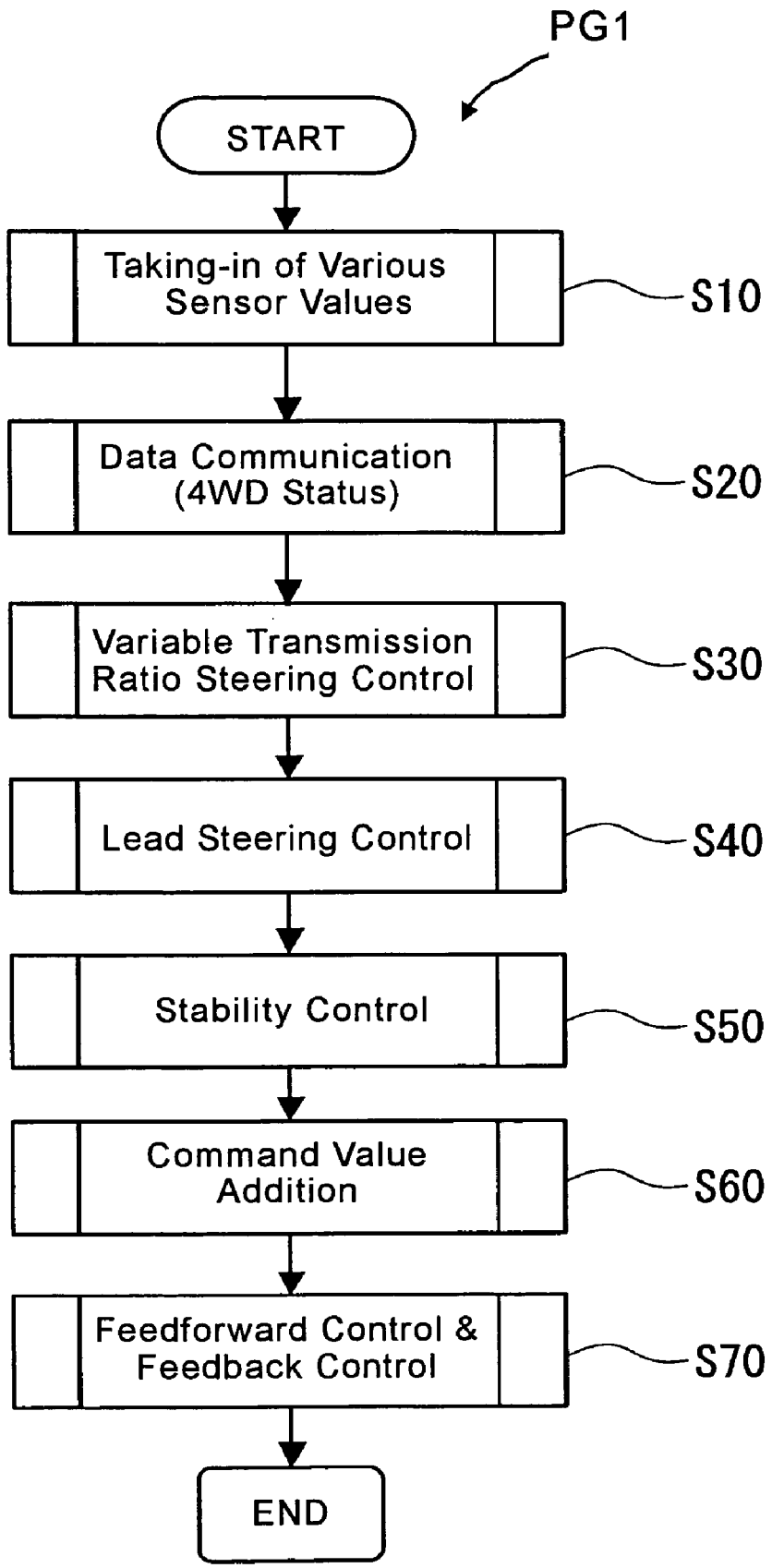
FIG. 2 is a flow chart showing a main program executed by a variable transmission ratio steering ECU.

The variable transmission ratio steering ECU 41 executes a main program PG1 for variable transmission ratio steering ECU shown in FIG. 2, at a predetermined time interval, whereby the ACT angle of the actuator 33 is controlled as it is controlled by a control system which is represented by an upper block diagram in FIG. 3. That is, when the main program PG1 for variable transmission ratio steering ECU is executed, as shown in FIG. 2, the variable transmission ratio steering ECU 41 takes thereinto values from various sensors for vehicle speed, longitudinal G-force, lateral G-force, steering angle and the like (step S10) and then, takes thereinto the 4WD status from the ITCC-ECU 49 by way of a vehicle LAN (step S20). Thereafter, the variable transmission ratio steering ECU 41 executes a variable transmission ratio steering control routine (step S30) to obtain an ACT command angle θ10 for variable transmission ratio steering control, executes a lead steering control routine (step S40) to obtain an ACT command angle θ20 for lead steering, and then, executes a stability control routine (step S50) to obtain an ACT command angle θ30 for stability control. Subsequently, the variable transmission ratio steering ECU 41 obtains an ACT command angle θ40 by making addition of these ACT command angles θ10, θ20 and θ30 (step S60) and then, performs a feed forward control and a feedback control so that the ACT angle of the actuator 33 follows the ACT command angle θ40 (step S70).

The vehicle speed taken into the variable transmission ratio steering ECU 41 is obtained by averaging detection values of the vehicle speed sensors 14A and 15A provided for the front wheels 14 and the rear wheels 15 as shown in FIG. 1. The lateral G-force is a centrifugal force acting on the vehicle 10 during a cornering (i.e., turn at a corner), and the lateral G-force is detected by an acceleration sensor (not shown) provided on the vehicle 10. Further, the longitudinal G-force is also detected by the acceleration sensor provided on the vehicle 10, and based on the longitudinal G-force, it is judged whether the vehicle is traveling on an ascent or is traveling on a descent. That is, since the vehicle speed, the longitudinal G-force and the gradient of a slope vary in correlation with one another, the gradient of any slope can be inferred from the variations in the vehicle speed and the longitudinal G-force. For example, the vehicle is inferred to being traveling on an ascent when a G-force directed rearward is being generated with the vehicle speed being kept constant.

Figure 5:
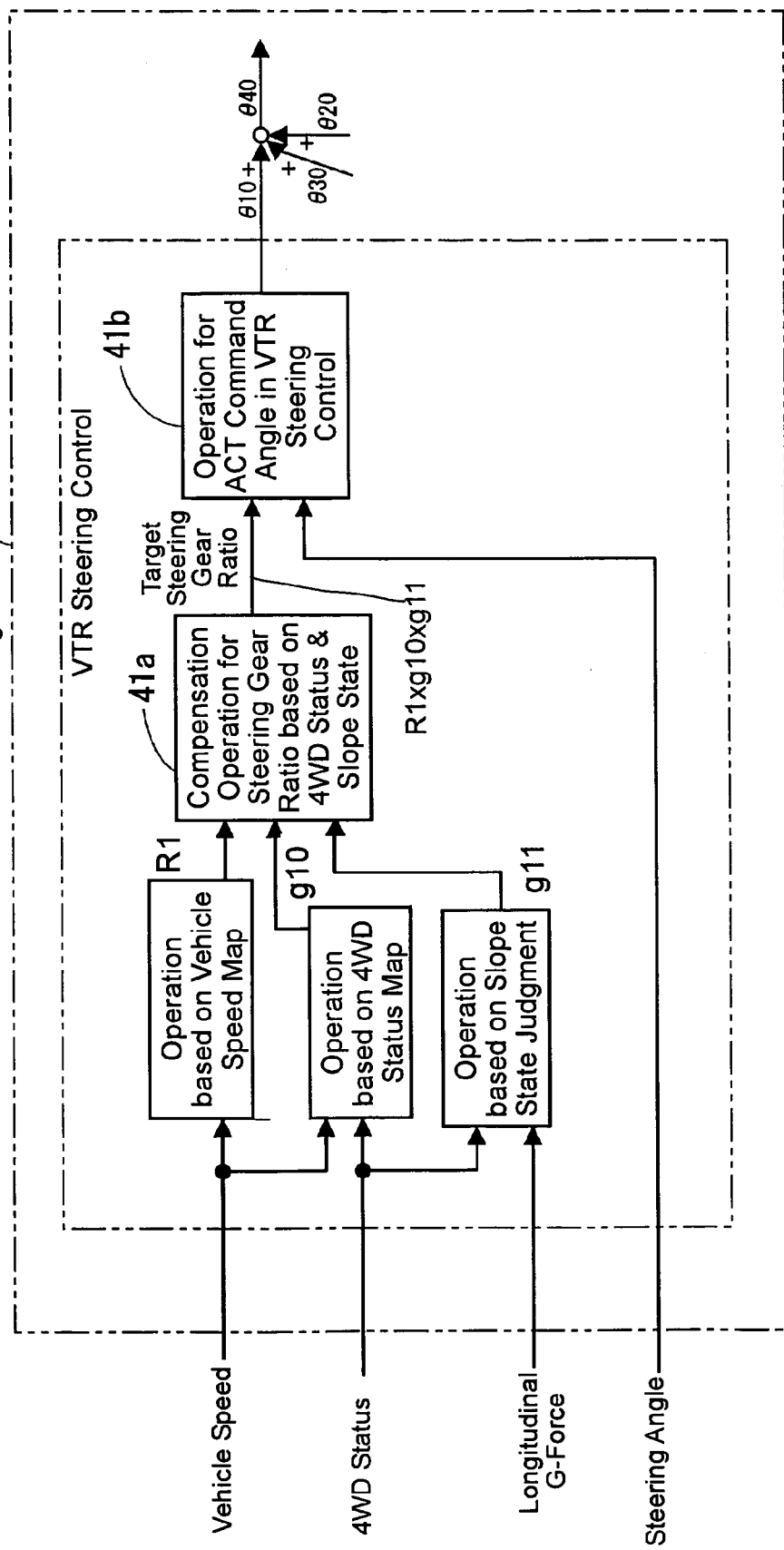
FIG. 5 is a block diagram representing the control operation performed in accordance with the control routine for variable transmission ratio steering.

In order to execute the variable transmission ratio steering control routine (step S30), a transmission ratio decision map, a first transmission ratio alteration map and a second transmission ratio alteration map are stored in a ROM (Read-only Memory: not shown) provided in the variable transmission ratio steering ECU 41 (refer to FIG. 5). Various vehicle speeds and various transmission ratios R1 are stored in the transmission ratio decision map in correlation with each other. Where the manipulation amount of the steering handle 31 and the steered amount of the front wheels 14 are taken as θ100 and θ101 respectively, the transmission ratio R1 in the present embodiment is calculated by the following expression.

Transmission Ratio $R1=\theta 100/\theta 101$

Thus, the steering amount of the steering handle 31 necessary to steer the front wheels 14 increase as the transmission ratio R1 becomes large (hereafter, this may be expressed by an expression "the steering gear becomes slow" from time to time). Conversely, the steering amount of the steering handle 31 necessary to steer the front wheels 14 decreases as the transmission ratio R1 becomes small (hereafter, this may be expressed by another expression "the steering gear becomes quick" from time to time).

Various values of the aforementioned 4WD status and various values of first transmission ratio alteration gains g10 are stored in a first transmission ratio alteration map in correlation with each other. In the first transmission ratio alteration map, the first transmission ratio alteration gain g10 is set to decrease as the torque distribution to the front wheels 14 determined by the 4WD status is decreased. More specifically, for example, where the torque distribution to the front wheels 14 is 100 percents, the first transmission ratio alteration gain g10 is set to indicate, e.g. "1". Further, the first transmission ratio alteration gain g10 becomes smaller than "1" as the torque distribution to the front wheels 14 is decreased to be smaller than 100 percents and becomes to indicate a predetermined value less than "1" when the 4WD status is decreased to 50 percents to reach the full four-wheel drive state.

A second transmission ratio alteration gain g11 which varies in dependence on whether the vehicle 10 is traveling on an ascent or on a descent is stored in a second transmission ratio alteration map. Values for ascent traveling of the second transmission ratio alteration gain g11 are set to be smaller than a value (e.g., "1") for horizontal traveling, whereas values for descent traveling of the second transmission ratio alteration gain g11 are set to be larger than the value for horizontal traveling.

Figure 4:
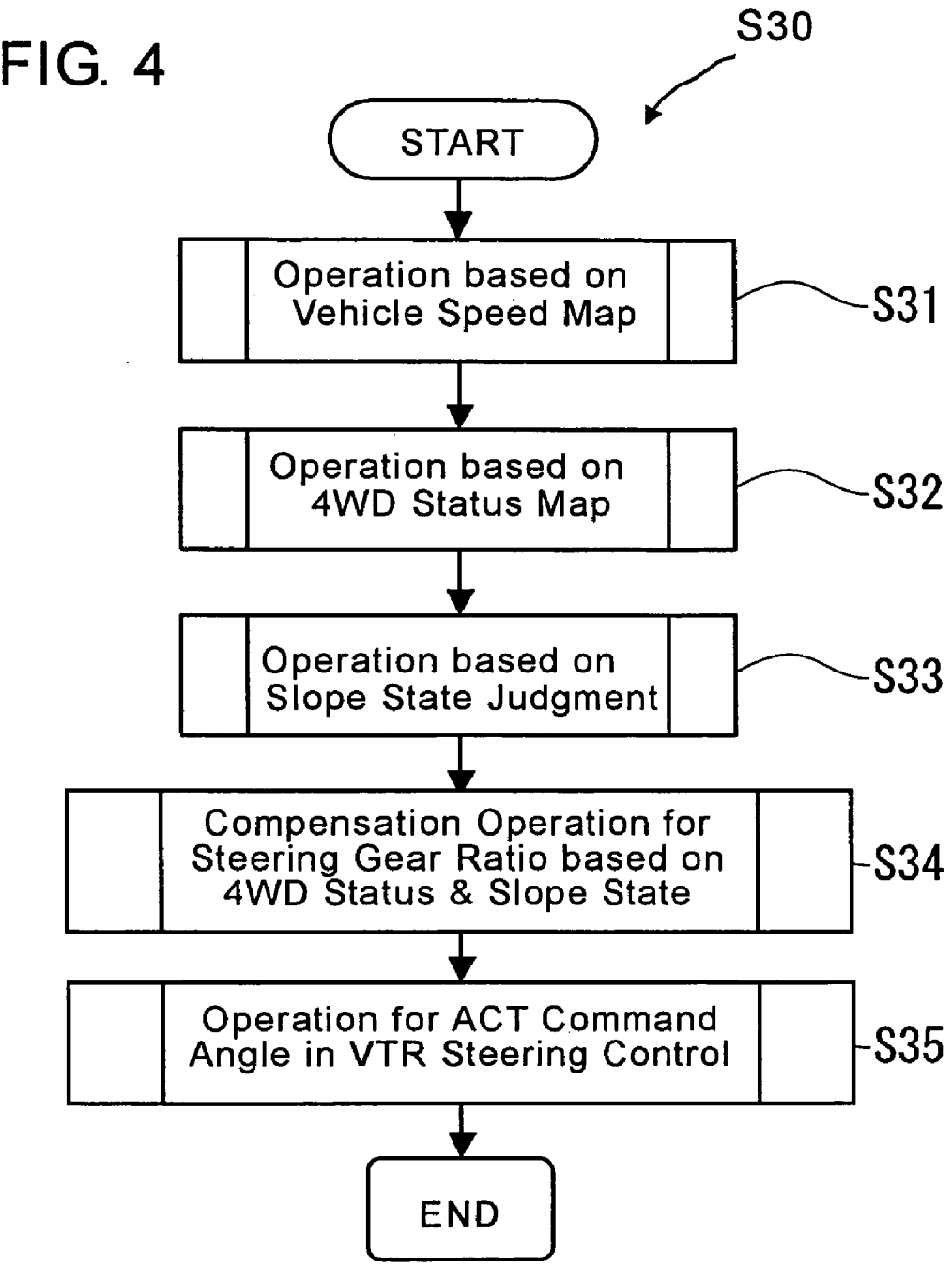
FIG. 4 is a flow chart showing a control routine for variable transmission ratio steering.

The variable transmission ratio steering ECU 41 executes the variable transmission ratio steering control routine (step S30) by reference to these maps. As shown in FIG. 4, the variable transmission ratio steering ECU 41 determines a transmission ratio R1 in dependence on the vehicle speed by reference to the transmission ratio decision map (step S31), determines a first transmission ratio alteration gain g10 in dependence on the 4WD status by reference to the first transmission ratio alteration map (step S32), and further determines a second transmission ratio alteration gain g11 in dependence on the longitudinal G-force (slope gradient) by reference to the second transmission ratio alteration map (step S33). Then, the variable transmission ratio steering ECU 41 revises or compensates the transmission ratio R1 by multiplying the transmission ratio R1 with the gains g10 and g11 at a steering gear ratio compensation calculation section 41a (refer to FIG. 5) (step S34). Then, at step S35, the variable transmission ratio steering ECU 41 calculates an ACT command angle θ10 for variable transmission ratio steering control from the compensated transmission ratio (=R1×g10×g11) and the steering angle of the steering handle 31 at an ACT command angle calculation section 41b (refer to FIG. 5) and thereafter leaves the variable transmission ratio steering control routine (step S30).

In this embodiment, a processing means at step S34 for compensating the transmission ratio R1 by multiplying the transmission ratio R1 with the first and second transmission ratio alteration gains g10 and g11 corresponds to transmission ratio alteration means in the present invention. When the torque distribution to the front wheels 14 is decreased (i.e., when the vehicle drive mode approaches from the two-wheel drive mode toward the four-wheel drive mode), the first transmission ratio alteration gain g10 becomes to be smaller. In this case, by performing the compensation of the transmission ratio R1 at step S34, the steering gear is altered toward "quick" side when the vehicle drive mode approaches from the two-wheel drive mode toward the four-wheel drive mode.

When the vehicle gets into ascent traveling, the second transmission ratio alteration gain g11 becomes to be smaller than that (e.g., "1") for horizontal traveling, in which case the compensation is performed at step S34 to shift the steering gear toward "quick" side. To the contrary, the steering gear is shifted toward "slow" side during the descent traveling.

Figure 6:
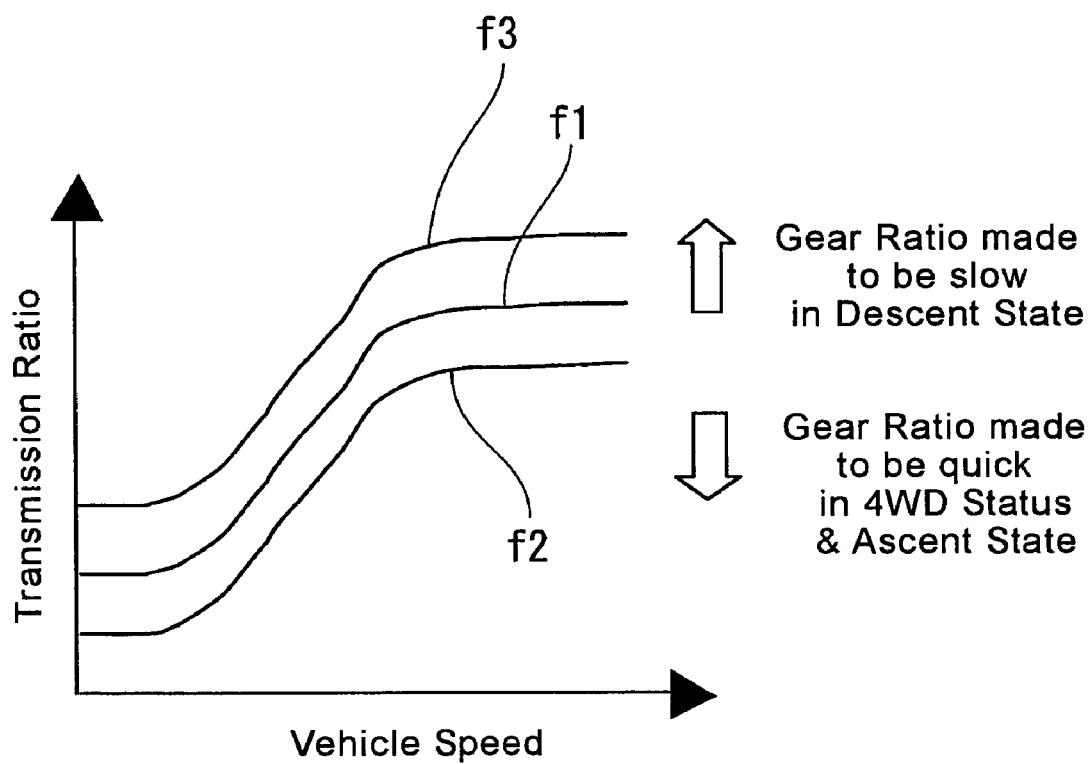
FIG. 6 is a graph representing a transmission ratio decision map.

Although at step S34, the transmission ratio R1 which is determined in dependence on the vehicle speed by reference to the transmission ratio decision map is multiplied with the gains g10 and g11, the transmission ratio decision map itself may be compensated by multiplying those parameters in the map with the gains g10 and g11, and the transmission ratio R1 may be determined in dependence on the vehicle speed by reference to the compensated transmission ratio decision map. FIG. 6 shows a reference curve f1 which represents the transmission ratio decision map before compensation in the form of a graph. The reference curve f1 is shifted to a curve f2 at the lower side in the graph when the steering gear is shifted to the "quick" side and is shifted to another curve f3 at the upper side in the graph when the steering gear is shifted to the "slow" side.

Figure 8:
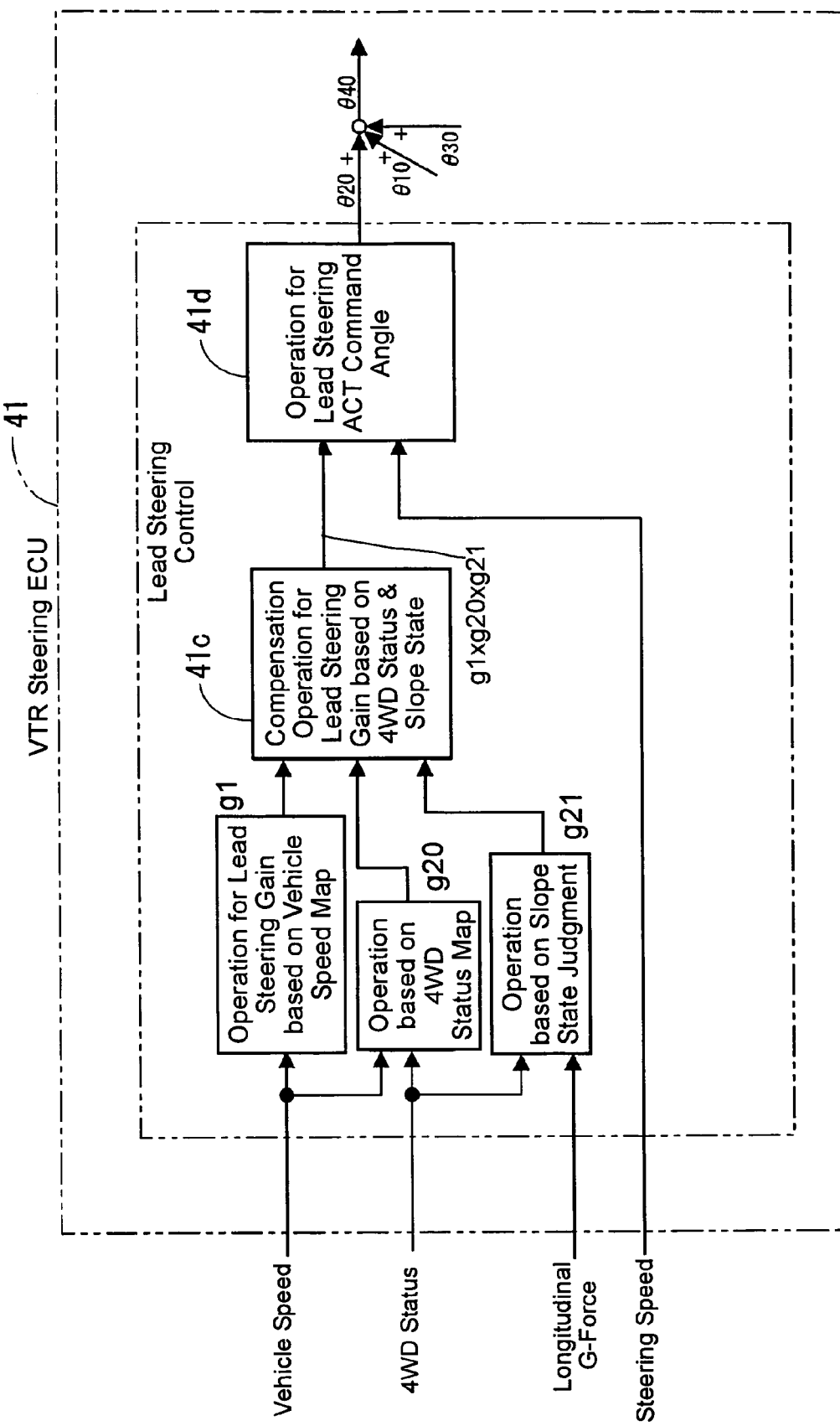
FIG. 8 is a block diagram representing the control operation performed in accordance with the lead steering control routine.

In order to execute the lead steering control routine (step S40), a responsiveness decision map, a first responsiveness alteration map and a second responsiveness alteration map are stored in the ROM (not shown) provided in the variable transmission ratio steering ECU 41 (refer to FIG. 8). A lead steering gain g1 (hereafter referred to as "LS gain g1") is the gain in controlling the steered angle of the steerable wheels 14 relative to the manipulation amount of the steering handle 31, and various values of the lead steering gain g1 are set in the responsiveness decision map in correlation with various vehicle speeds.

Various values of the 4WD status and various values of first responsiveness alteration gain g20 are stored in the first responsiveness alteration map in correlation with each other. The first responsiveness alteration gain g20 is set to become larger as the torque distribution to the front wheels 14 determined by the 4WD status is decreased. More specifically, for example, where the torque distribution to the front wheels 14 is 100 percents, the first responsiveness alteration gain g20 is set to indicate, e.g. "1". Further, the first responsiveness alteration gain g20 becomes larger as the torque distribution to the front wheels 14 is decreased to be smaller than 100 percents and becomes to indicate a predetermined value larger than "1" when the 4WD status is decreased to 50 percents to reach the full four-wheel drive state.

A second responsiveness alteration gain g21 which varies in dependence on whether the vehicle 10 is traveling on an ascent or on a descent is stored in the second responsiveness alteration map. Values for ascent traveling of the second responsiveness alteration gain g21 are set to be larger than a value (e.g., "1") for horizontal traveling, whereas values for descent traveling of the second responsiveness alteration gain g21 are set to be smaller than the value for horizontal traveling.

Figure 7:
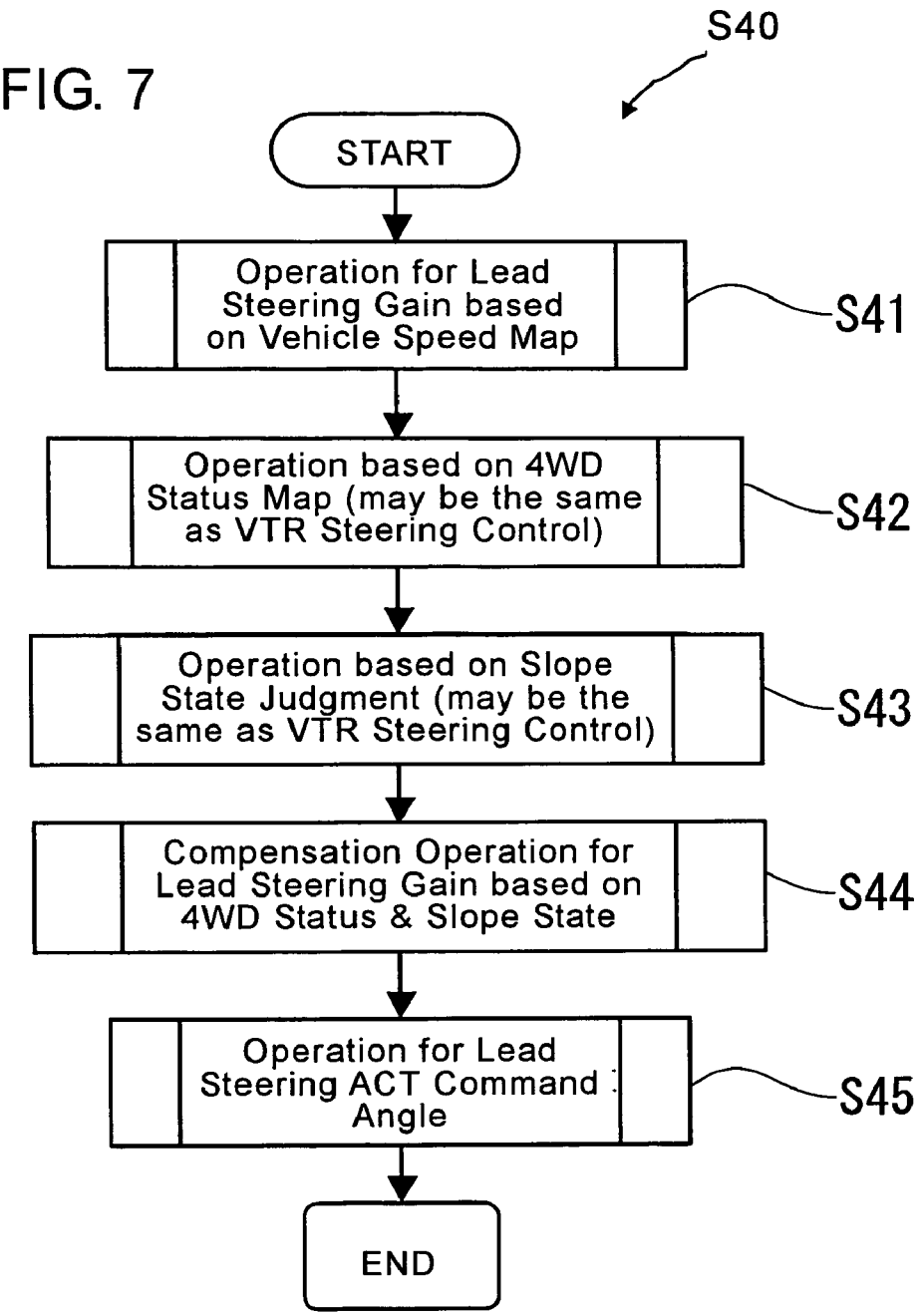
FIG. 7 is a flow chart showing a lead steering control routine.

The variable transmission ratio steering ECU 41 executes the lead steering control routine (step S40) by reference to these maps. As shown in FIG. 7, the variable transmission ratio steering ECU 41 determines an LS gain g1 in dependence on the vehicle speed by reference to the responsiveness decision map (step S41), determines a first responsiveness alteration gain g20 in dependence on the 4WD status by reference to the first responsiveness alteration map (step S42), and further determines a second responsiveness alteration gain g21 in dependence on the longitudinal G-force by reference to the second responsiveness alteration map (step S43). Then, the variable transmission ratio steering ECU 41 revises or compensates the LS gain g1 by multiplying the LS gain g21 with the gains g20 and g21 at a lead steering gain compensation calculation section 41c (refer to FIG. 8). Then, at step S45, the variable transmission ratio steering ECU 41 calculates a lead steering ACT command angle θ20 from the compensated LS gain (=g1×g20×g21) and the steering speed of the steering handle 31 at a lead steering ACT command angle calculation section 41d (refer to FIG. 8) and thereafter leaves the lead steering control routine (step S40).

In this embodiment, a processing means at step S44 for compensating the LS gain g1 by multiplying the LS gain g1 with the first and second responsiveness alteration gains g20 and g21 corresponds to responsiveness alteration means in the present invention. When the torque distribution to the front wheels 14 is decreased (i.e., when the vehicle drive mode approaches from the two-wheel drive mode toward the four-wheel drive mode), the first responsiveness alteration gain g20 becomes larger. In this case, by performing the compensation of the LS gain g1 at step S44, the responsiveness is altered to a higher side when the vehicle drive mode approaches from the two-wheel drive mode toward the four-wheel drive mode.

Since the values for ascent traveling of the second responsiveness alteration gain g21 is set to be larger than that (e.g., "1") for horizontal traveling, the compensation at step S44 causes the responsiveness in the ascent traveling to be altered toward the higher side and also causes the responsiveness in the descent traveling to be altered toward a lower side.

Figure 9:
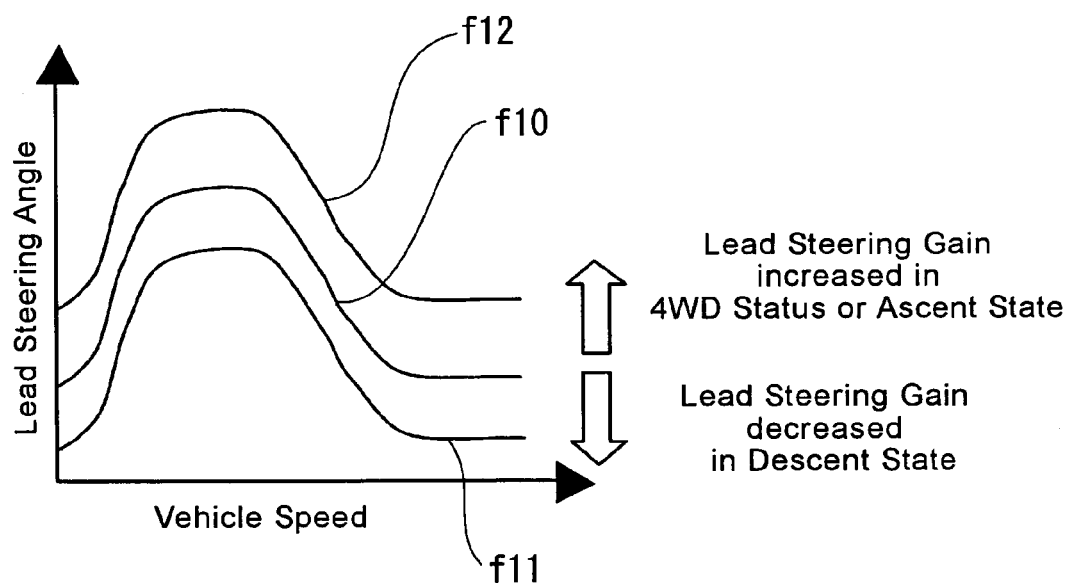
FIG. 9 is a graph representing a responsiveness decision map.

Although at step S44, the LS gain g1 which is determined in dependence on the vehicle speed by reference to the responsiveness decision map is multiplied with the gains g20 and g21, this responsiveness decision map itself may be compensated by multiplying those parameters in the map with the gains g20 and g21, and the LS gain g1 may be determined in dependence on the vehicle speed by reference to the compensated responsiveness decision map. FIG. 9 shows a reference curve f10 which represents the responsiveness decision map before compensation in the form of a graph. The reference curve f10 is shifted to a curve f12 at the upper side in the graph when the responsiveness is altered toward the higher side and is shifted to another curve f11 at the lower side in the graph when the responsiveness is altered toward the lower side.

Figure 10:
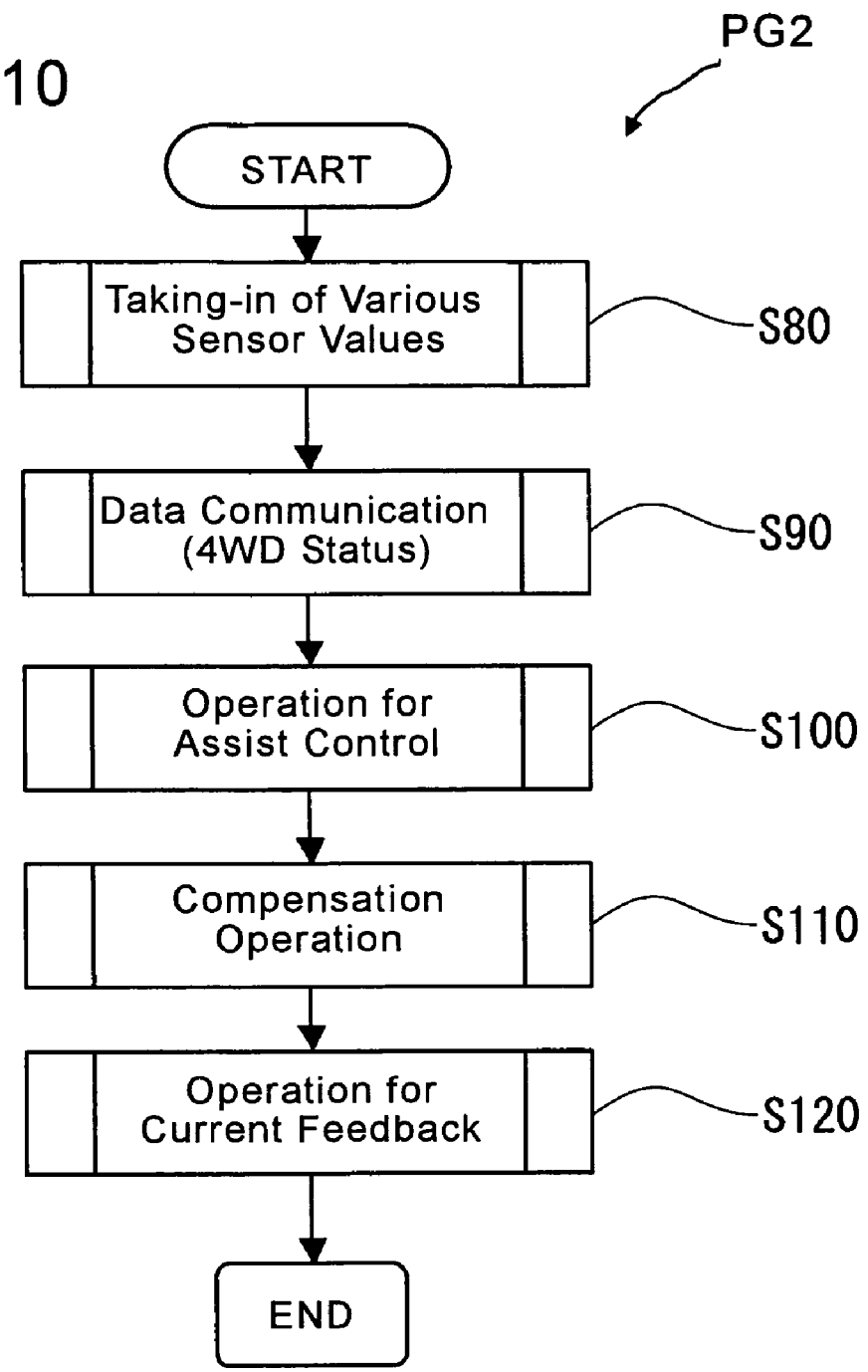
FIG. 10 is a flow chart showing an EPS-ECU main program.

The EPS-ECU 40 executes an EPS-ECU main program PG2 shown in FIG. 10 at a predetermined time interval, whereby the assist force of the electric power steering device 32 is controlled as it is controlled by a control system which is represented by a lower block diagram in FIG. 3. That is, when the EPS-ECU main program PG2 is executed, as shown in FIG. 10, the EPS-ECU 40 takes thereinto values from various sensors for vehicle speed, longitudinal G-force, lateral G-force, steering angle and the like (step S80) and then, takes thereinto the 4WD status from the ITCC-ECU 49 by performing data communication by way of a vehicle LAN (step S90). Thereafter, the EPS-ECU 40 executes an assist control routine (step S100) to calculate a drive current command value I1. Then, the EPS-ECU 40 executes a routine for various compensation controls (torque inertia compensation control, handle return control and damping compensation control) to calculate drive current compensation command values I2, I3 and I4 (step S110). The EPS-ECU 40 then calculates an electric current command value I by adding the drive current compensation command values I2, I3 and I4 to the drive current command value I1 and performs a current feedback control so that the electric current applied to the servomotor 39 of the electric power steering device 32 coincides with the electric current command value I (step S120).

Figure 12:
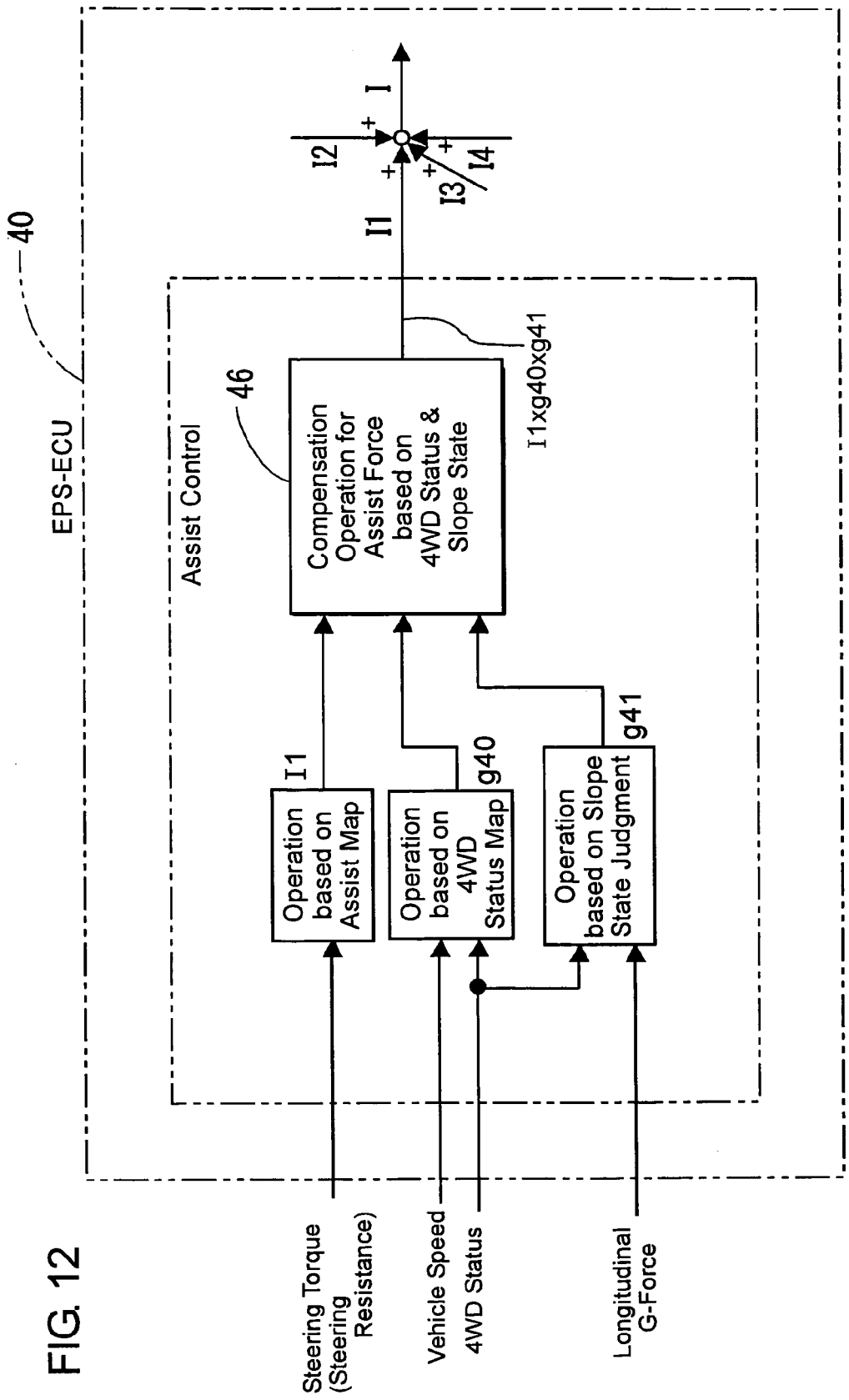
FIG. 12 is a block diagram representing the control operation performed in accordance with the assist control routine.

In order to execute the assist control routine (step S100), an assist force decision map and first and second assist force alteration maps are stored in a ROM (not shown) provided in the EPS-ECU 40 (refer to FIG. 12). Various values of the drive current command I1, to be applied to the servomotor 39 of the electric power steering device 32, and various values of the steering torque are stored in the assist force decision map in correlation with each other. Various values of a first assist force alteration gain g40 and various values of the 4WD status are stored in the first assist force alteration map in correlation with each other. The first assist force alteration gain g40 is set to become smaller as the torque distribution to the front wheels 14 determined by the 4WD status is decreased. More specifically, for example, where the torque distribution to the front wheels 14 in the 4WD state is 100 percents, the first assist force alteration gain g40 is set to indicate, e.g. "1". Further, the first assist force alteration gain g40 becomes smaller than "1" as the torque distribution to the front wheels 14 is decreased to be smaller than 100 percents and becomes to indicate a predetermined value smaller than "1" when the 4WD status is decreased to 50 percents to reach the full four-wheel drive state.

A second assist force alteration gain g41 which varies in dependence on whether the vehicle 10 is in ascent traveling or descent traveling is stored in the second assist force alteration map. Values for ascent traveling of the second assist force alteration gain g41 are set to be smaller than a value (e.g., "1") for horizontal traveling, whereas values for descent traveling of the second assist force alteration gain g41 are set to be larger than the value for horizontal traveling.

Figure 11:
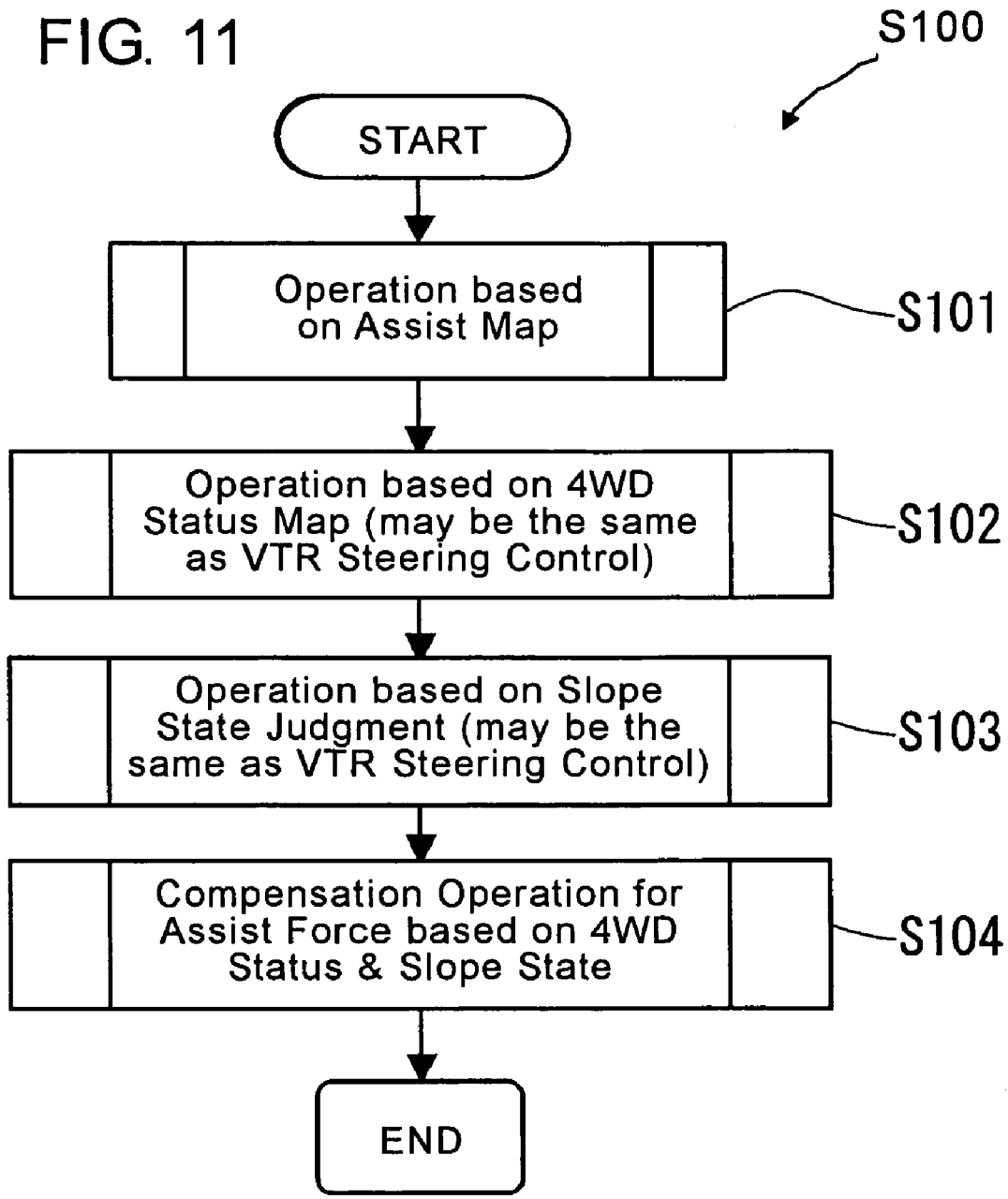
FIG. 11 is a flow chart showing an assist control routine.

The EPS-ECU 40 executes the assist control routine (step S100) by reference to these maps. As shown in FIG. 11, the EPS-ECU 40 determines a drive current command value I1 in dependence on the steering torque detected by the torque sensor 37 by reference to the assist force decision map (step S101), determines a first assist force alteration gain g40 in dependence on the 4WD status by reference to the first assist force alteration map (step S102), and further determines a second assist force alteration gain g41 in dependence on the longitudinal G-force by reference to the second assist force alteration map (step S103). Then, at step S104, the EPS-ECU 40 revises or compensates the drive current command value I1 by multiplying the drive current command value I1 with the gains g40 and g41 at an assist force compensation operation section 46 (refer to FIG. 12) and thereafter leaves the assist control routine (step S100).

In this embodiment, a processing means at step S104 for compensating the drive current command value I1 by multiplying the same with the first and second assist force alteration gains g40 and g41 corresponds to assist force alteration means in the present invention. When the torque distribution to the front wheels 14 is decreased (i.e., when the vehicle drive mode approaches from the two-wheel drive mode toward the four-wheel drive mode), the first assist force alteration gain g40 becomes smaller. In this case, by performing the compensation at step S104, the assist force is altered to be increased when the vehicle drive mode approaches from the two-wheel drive mode toward the four-wheel drive mode.

Since values for ascent traveling of the second assist force alteration gain g41 are set to be smaller than that (e.g., "1") for horizontal traveling, the compensation at step S104 causes the assist force in the ascent traveling to be altered toward a decreasing side and also causes the assist force in the descent traveling to be altered toward an increasing side.

Figure 13:
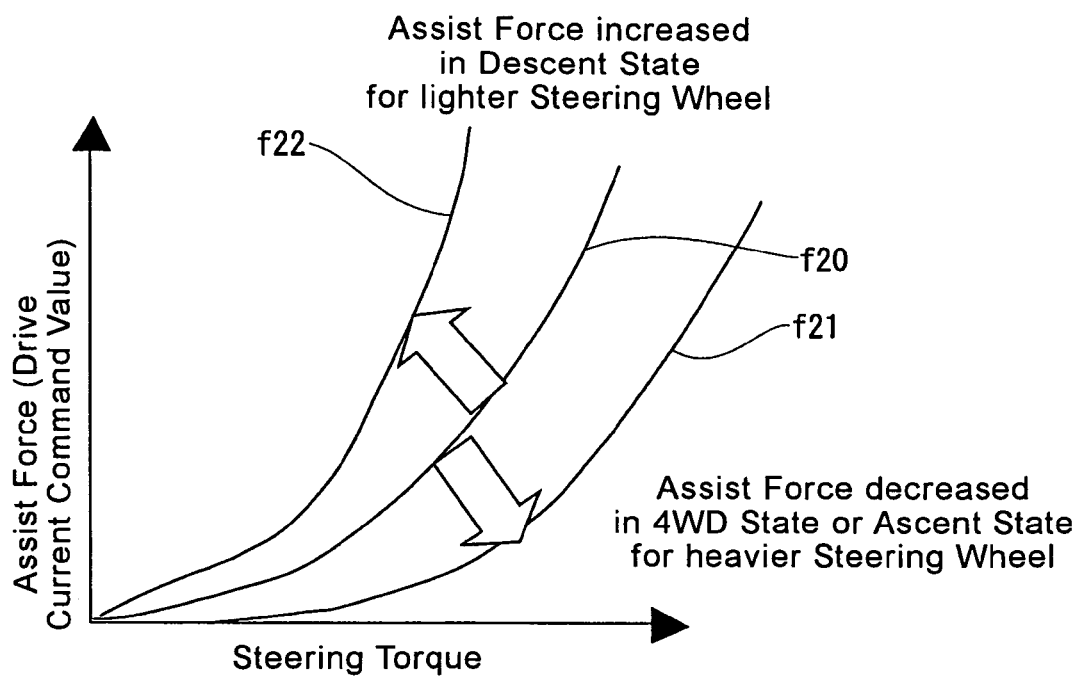
FIG. 13 is a graph representing an assist force decision map.

Although at step S104, the drive current command value I1 is determined by multiplying with the gains g40 and g41 the drive current command value I1 which is determined in dependence on the steering torque by reference to the assist force decision map, the assist force decision map itself may be compensated by multiplying those parameters in the map with the gains g40 and g41, and the drive current command value I1 may be determined in dependence on the steering torque by reference to the compensated assist force decision map. FIG. 13 shows a reference curve f20 which represents the assist force decision map before compensation in the form of a graph. The reference curve f20 is shifted to a curve f22 at the upper side in the graph when the assist force is altered to be increased and is shifted to another curve f21 at the lower side in the graph when the assist force is altered to be decreased.

(Operation)

Next, the operation of the embodiment as constructed above will be described hereinafter.

During the traveling of the vehicle 10, the detection value of the acceleration sensor varies in dependence on the acceleration or deceleration of the vehicle 10 as well as in dependence on the gradient of ascent traveling or descent traveling. Thus, the variable transmission ratio steering ECU 41 and the EPS-ECU 40 discriminate either of horizontal traveling, ascent traveling and descent traveling from one another. That is, the variable transmission ratio steering ECU 41 and the EPS-ECU 40 operates to judge whether the vehicle is traveling on a horizontal road, an ascent road or a descent road.

Where the vehicle 10 gets into ascent traveling, the steering resistance that the front wheels 14 receive from the road surface lowers since the vehicle body weight is more born on the rear wheels 15 while the burden on the front wheels 14 is lessened. In this case, the variable transmission ratio steering ECU 41 alters the transmission ratio R1 to bring the steering gear into the "quick" side so that the steering resistance is made to be easily transmitted to the steering handle 31, while the EPS-ECU 40 lowers the assist force generated by the electric power steering device 32 to make the steering handle 31 heavier to manipulate. As a consequence, it can be realized to suppress the variation of the steering resistance which the driver receives on the steering handle 31.

On the other hand, where the vehicle 10 gets into descent traveling, the steering resistance that the front wheels 14 receive from the road surface increases compared with that in horizontal traveling. In this case, the variable transmission ratio steering ECU 41 alters the transmission ratio R1 to bring the steering gear into the "slow" side so that the steering resistance is made hard to be transmitted to the steering handle 31, while the EPS-ECU 40 increases the assist force generated by the electric power steering device 32 to make the steering handle 31 lighter to manipulate. As a consequence, it can also be realized to suppress the variation of the steering resistance which the driver receives on the steering handle 31.

Further, when the vehicle 10 gets into ascent traveling, the steering resistance (friction) that the front wheels 14 receive from the road surface lowers, and this lowers the follow responsiveness of the front wheels 14 to the steering manipulation. To cope with this, the variable transmission ratio steering ECU 41 alters the LS gain g1 to heighten the responsiveness. As a consequence, it can be realized to suppress the variation of the responsiveness the driver receives on the steering handle 31.

When the vehicle 10 gets into descent traveling, on the other hand, the steering resistance (friction) that the front wheels 14 receive from the road surface increases, and this heightens the follow responsiveness of the front wheels 14 to the steering manipulation in dependence on the steering speed of the steering handle 31. To cope with this, the variable transmission ratio steering ECU 41 alters the LS gain g1 to lower the responsiveness. As a consequence, it can be realized to suppress the variation of the responsiveness the driver receives on the steering handle 31. In this manner, in the steering system 30 in the present embodiment, the steering resistance and the vehicle turn responsiveness to the steering manipulation can be kept constant regardless of whether ascent traveling or descent traveling, whereby the steering feeling can be kept stable.

With fuel efficiency being taken into account, the ITCC-ECU 49 provided in the present embodiment controls the torque transmission device 20 during straight-ahead traveling at a constant speed so that the torque distribution (4WD status) of the traveling drive torque to the front wheels 14 and the rear wheels 15 comes to the ratio of 100:0 to bring the drive mode into the two-wheel drive state in which the front wheels 14, 14 only are driven. When the slip of the front wheels 14 is detected based on the variation or the like of the detection values from the vehicle speed sensors 14A and 15A, the ITCC-ECU 49 shifts the drive mode toward the four-wheel drive mode by decreasing the torque distribution to the front wheels 14 from 100 percents and by increasing the torque distribution to the rear wheels 15 in order to suppress the slip of the front wheels 14. Then, when the occurrence of the slip is prevented in this manner, the ITCC-ECU 49 shifts the drive mode of the vehicle 10 toward the two-wheel drive mode by increasing the torque distribution to the front wheels 14.

Where the torque distribution to the front wheels 14 is increased, it becomes hard to change the traveling direction. In this case, the variable transmission ratio steering ECU 41 alters the transmission ratio R1 to make the steering gear "quick". Thus, the front wheels 14 become easily steerable by the steering manipulation of a lesser amount, whereby the variation of the steering feeling can be suppressed. Where the torque distribution to the front wheels 14 is decreased, on the other hand, it becomes easy to change the traveling direction. In this case, the variable transmission ratio steering ECU 41 alters the transmission ratio R1 to make the steering gear "slow". Thus, a more amount of the steering manipulation is needed to steer the front wheels 14, whereby the variation of the steering feeling can be suppressed.

Where the torque distribution to the front wheels 14 is increased, the drive power given to the front wheels 14 is increased to lower the steering resistance acting on the front wheels 14. To cope with this, the EPS-ECU 40 decreases the assist force when the torque distribution to the front wheel 14 is increased, whereby the variation of the steering feeling can be suppressed. When the torque distribution to the front wheels 14 is decreased, on the contrary, the drive power given to the front wheels 14 is decreased to increase the steering resistance acting on the front wheels 14. Thus, the EPS-ECU 40 increases the assist force when the torque distribution to the front wheel 14 is decreased, whereby the variation of the steering feeling can be suppressed.

Further, the responsiveness in the turn of the vehicle 10 to the manipulation of the steering handle 31 lowers where the torque distribution to the front wheels 14 is increased. To cope with this, the variable transmission ratio steering ECU 41 alters the LS gain g1 to heighten the responsiveness, whereby the variation of the responsiveness which the driver feels on the steering handle 31 can be suppressed. On the other hand, the responsiveness in the turn of the vehicle 10 to the manipulation of the steering handle 31 rises where the torque distribution to the front wheels 14 is decreased. To cope with this, the variable transmission ratio steering ECU 41 alters the LS gain g1 to lower the responsiveness, whereby the variation of the responsiveness which the driver feels on the steering handle 31 can be suppressed.

In this way, in the steering system 30 in the present embodiment, it can be realized to suppress the variation of the steering feeling which is caused by an increase or decrease in the torque distribution to the steerable wheels 14 as well as in dependence on the gradient in the ascent or descent traveling. Thus, it becomes possible to make the steering feeling stable.

(Other Embodiments or Modifications)

The present invention is not limited to the foregoing embodiment. For example, the present invention encompasses the below-described embodiments within the technological scope thereof. Further, the present invention can be practiced in various other forms than that described above insofar as it does not depart from the gist thereof.

(1) Although the alteration gains g10, g20 and g40 pertaining to the 4WD status which are used respectively in the variable transmission ratio steering control, the lead steering control and the assist control are set separately in the foregoing embodiment, the same alteration gain g10 (g20 or g40) may be used commonly for at least two controls of the variable transmission ratio steering control, the lead steering control and the assist control.

(2) In the foregoing embodiment, any of the alteration gains g11, g21 and g41 pertaining to the longitudinal G-force which are used respectively in the variable transmission ratio steering control, the lead steering control and the assist control may also be used commonly for at least two controls of the variable transmission ratio steering control, the lead steering control and the assist control.

(3) Although in the foregoing embodiment, three kinds of the gains are provided in correspondence to ascent traveling, descent traveling and horizontal traveling, plural kinds of gains may be set in dependence on the angle of the ascent gradient, and plural kinds of gains may be set in dependence on the angle of the descent gradient. With the construction so arranged, it can be realized to make the steering feeling stable even where the angle of the gradient varies considerably.

(4) In the foregoing embodiment, an attempt has been made to make the steering feeling stable by altering the transmission ratio R1, the responsiveness, the assist force of the steering mechanical train 32-37 in connection with both of the variation of the 4WD status (the variation of the drive mode) and the variation of the longitudinal G-force (the variation of the gradient in ascent traveling or the descent traveling). In another attempt, the steering feeling may be made to be stable by altering the transmission ratio, the responsiveness, the assist force of the steering mechanical train 32-37 in connection with either the variation of the drive mode or the variation of the gradient in ascent traveling or descent traveling.

(5) In the foregoing embodiment, an attempt is made to make the steering feeling stable by altering all of the transmission ratio, the responsiveness and the assist force of the steering mechanical train 32-37 in connection of the variation of the drive mode and the variation of the gradient of the traveling road surface. In another attempt, the steering feeling may be made to be stable by altering at least one or two of the transmission ratio, the responsiveness and the assist force of the steering mechanical train 32-37 in connection with the variation of the drive mode or the variation of the gradient of the traveling road surface.

(6) In the foregoing embodiment, the transmission ratio R1 between the steering handle 31 and the steerable wheels 14, the responsiveness of the steerable wheels 14 in steered angle or the assist force depending on the manipulation of the steering handle 31 are controlled in dependence on the torque distribution of the traveling drive torque to the steerable wheels 14 and the non-steerable wheels 15. Instead, these controls may be performed by taking the magnitude of the traveling drive torque output from the engine 11 into consideration in torque distribution. By taking the magnitude of the traveling drive torque into consideration in torque distribution, the limitations of the capacity of tires in gripping the road surface can be grasped more accurately, whereby the accuracy in the steering control can be enhanced.

Various features and many of the attendant advantages in the foregoing embodiments will be summarized as follows:

When the vehicle 10 gets into ascent traveling, the load onto the rear wheels (non-steerable wheels) 15 increases, while the load onto the front wheels (steerable wheels) 14 decreases. Thus, the steering resistance which the steerable wheels 14 receive from the load surface lowers compared with that in horizontal traveling. To cope with this, in the steering system 30 in the foregoing first embodiment typically shown in FIGS. 1 and 4-6, the transmission ratio R1 of the steering mechanical train 32-37 is altered to decrease the manipulation amount of the steering handle 31 necessary to steer the steerable wheels 14 compared with that in the horizontal traveling. As a result, the steering resistance becomes liable to be transmitted to the steering handle 31, and the variation of the steering feeling can be suppressed. On the other hand, when the vehicle 10 gets into descent traveling, the load onto the front wheels (steerable wheels) 14 increases, and the steering resistance increases compared with that in horizontal traveling. To cope with this, in the steering system 30 in the foregoing first embodiment typically shown in FIGS. 1 and 4-6, the transmission ratio R1 of the steering mechanical train 32-37 in descent traveling is altered to increase the manipulation amount of the steering handle necessary to steer the steerable wheels 14 compared with that in horizontal traveling. Thus, the steering resistance becomes hard to be transmitted to the steering handle 31, and the variation of the steering feeling can be suppressed. In this way, the steering feeling given to the driver can be made to be stable.

In the steering system 30 in the foregoing first embodiment typically shown in FIGS. 1 and 4-6, the transmission ratio R1 is altered by multiplying a transmission ratio R1 which is determined in dependence on the vehicle speed by reference to the transmission ratio decision map (FIG. 6), with a transmission ratio alteration gain g11 which is determined in dependence on the gradient in ascent traveling or descent traveling by reference to the transmission ratio alteration map. Thus, it can be realized to suppress the steering feeling irrespective of the angle of the gradient.

When the vehicle 10 gets into ascent traveling, the responsiveness of the vehicle turn to the steering manipulation lowers since the load onto the front wheels (steerable wheels) 14 decreases. To cope with this, in the steering system 30 in the foregoing first embodiment typically shown in FIGS. 1 and 7-9, the follow responsiveness of the steerable wheels 14 to the steering manipulation in ascent traveling is heightened compared with that in horizontal traveling. Thus, it can be realized to suppress the variation in the responsiveness to the vehicle turn. On the other hand, the responsiveness of the vehicle turn to the steering manipulation rises when the vehicle 10 gets into descent traveling. To cope with this, in the steering system 30 in the foregoing first embodiment typically shown in FIGS. 1 and 7-9, the follow responsiveness of the steerable wheels 14 to the steering manipulation in descent traveling is lowered compared with that in horizontal traveling, and thus, it can be realized to suppress the variation in the responsiveness to the vehicle turn. In this way, in the steering system 30, it becomes possible to make the steering feeling stable.

In the steering system 30 in the foregoing first embodiment typically shown in FIGS. 1 and 7-9, the responsiveness is altered to increase the steering manipulation amount necessary to steer the steerable wheels 14 by multiplying a lead steering gain g1 which is determined in dependence on the vehicle speed by reference to the responsiveness decision map (FIG. 9), with a responsiveness alteration gain g21 which is determined in dependence on the gradient of the road surface by reference to the responsiveness alteration map. Thus, it can be realized to suppress the variation of the steering feeling irrespective of the angle of the gradient.

When the vehicle 10 gets into ascent traveling, the steering resistance which the steering handle 31 receives from the road surface decreases compared with that in horizontal traveling, thereby to make the steering manipulation lighter. To cope with this, in the steering system 30 in the foregoing first embodiment typically shown in FIGS. 1 and 10-13, the assist force for the steering manipulation in ascent traveling is decreased compared with that in horizontal traveling. Thus, it can be realized to suppress the variation of the steering feeling. On the other hand, when the vehicle 10 gets into descent traveling, the steering resistance which the steering handle 31 receives from the road surface increases thereby to make the steering manipulation heavier. To cope with this, in the steering system 30 in the foregoing first embodiment typically shown in FIGS. 1 and 10-13, the assist force for the steering manipulation in descent traveling is increased compared with that in horizontal traveling. Thus, it can be realized to suppress the variation of the steering feeling. In this way, it becomes possible to make the steering feeling stable in the steering system 30.

In the steering system 30 in the foregoing first embodiment typically shown in FIGS. 1 and 10-13, the assist force is altered by multiplying a command value I1 of the assist force which is determined in dependence on the steering torque by reference to the assist force decision map (FIG. 13), with an assist force alteration gain g41 which is determined in dependence on the gradient in ascent traveling or descent traveling by reference to the assist force alteration map. Thus, it can be realized to suppress the variation of the steering feeling irrespective of the angle of the gradient.

It has been known that when the torque distribution to the steerable wheels 14 is increased, the yawing at the beginning of a turn tends to occur insensitively and the traveling direction becomes hard to be changed. To cope with this, in the steering system 30 in the foregoing first embodiment typically shown in FIGS. 1 and 4-6, the transmission ratio R1 is altered so that the manipulation amount of the steering handle 31 necessary to steer the steerable wheels 14 is decreased when the torque distribution to the steerable wheels 14 is increased. Thus, the steerable wheels 14 is enabled to be steered by a smaller steering manipulation, whereby it can be realized to suppress the variation of the steering feeling. On the other hand, when the torque distribution to the steerable wheels 14 is decreased, the traveling direction becomes liable to be changed. To cope with this, in the steering system 30 in the foregoing first embodiment typically shown in FIGS. 1 and 4-6, the transmission ratio R1 is altered so that the manipulation amount of the steering handle 31 necessary to steer the steerable wheels 14 is increased when the torque distribution to the steerable wheels 14 is decreased. Thus, the steering manipulation comes to need much more steering manipulation to steer the steerable wheels 14, whereby it can be realized to suppress the variation of the steering feeling. In this way, it becomes possible to make the steering feeling stable in the steering system 30.

In the steering system 30 in the foregoing first embodiment typically shown in FIGS. 1 and 4-6, the transmission ratio R1 is altered by multiplying a transmission ratio R1 which is determined in dependence on the vehicle speed by reference to the transmission ratio decision map (FIG. 6), with a transmission ratio alteration gain g10 which is determined in dependence on the torque distribution to the steerable wheels 14 and the non-steerable wheels 15 by reference to the transmission ratio alteration map. Thus, it can be realized to suppress the variation of the steering feeling irrespective of the increase or decrease of the torque distribution to the steerable wheels 14.

The responsiveness of the vehicle turn to the steering manipulation lowers when the torque distribution to the steerable wheels 14 is increased. To cope with this, in the steering system 30 in the foregoing first embodiment typically shown in FIGS. 1 and 7-9, the follow responsiveness of the steerable wheels 14 to the steering manipulation is heightened when the torque distribution to the steerable wheels 14 is increased. Thus, it can be realized to suppress the variation of the responsiveness in the vehicle turn. On the other hand, the responsiveness of the vehicle turn to the steering manipulation is suppressed to lower when the torque distribution to the steerable wheels 14 is decreased. To cope with this, in the steering system 30 in the foregoing first embodiment typically shown in FIGS. 1 and 7-9, the follow responsiveness of the steerable wheels 14 to the steering manipulation is lowered when the torque distribution to the steerable wheels 14 is decreased, whereby it can be realized to suppress the variation of the responsiveness in the vehicle turn. In this way, it becomes possible to make the steering feeling stable in the steering system 30.

In the steering system 30 in the foregoing first embodiment typically shown in FIGS. 1 and 7-9, the responsiveness alteration means 41c alters the responsiveness g1 by multiplying a lead steering gain g1 which is determined in dependence on the vehicle speed by reference to the responsiveness decision map (FIG. 9), with a responsiveness alteration gain g20 which is determined in dependence on the torque distribution to the steerable wheels 14 and the non-steerable wheels 15 by reference to the responsiveness alteration map. Thus, it can be realized to suppress the variation of the steering feeling irrespective of the increase or decrease in the torque distribution to the steerable wheels 14.

When the torque distribution to the steerable wheels 14 is increased, the drive power given to the steerable wheels 14 is increased to lower the steering resistance acting on the steering handle 31. To cope with this, in the steering system 30 in the foregoing first embodiment typically shown in FIGS. 1 and 10-13, the assist force is lowered when the torque distribution to the steerable wheels 14 is increased, whereby it can be realized to suppress the variation of the steering feeling. On the other hand, when the torque distribution to the steerable wheels 14 is decreased, the drive power given to the steerable wheels 14 is also decreased to increase the steering resistance acting on the steering handle 31. To cope with this, in the steering system 30 in the foregoing first embodiment typically shown in FIGS. 1 and 10-13, the assist force is increased when the torque distribution to the steerable wheels 14 is decreased, whereby it can be realized to suppress the variation of the steering feeling. In this way, it becomes possible to make the steering feeling stable in the steering system 30.

In the steering system 30 in the foregoing first embodiment typically shown in FIGS. 1 and 10-13, the assist force alteration means 46 alters the assist force I1 by multiplying a command value I1 of the assist force which is determined in dependence on the steering torque by reference to the assist force decision map (FIG. 13), with an assist force alteration gain g40 which is determined in dependence on the torque distribution to the steerable wheels 14 and the non-steerable wheels 15 by reference to the assist force alteration map. Thus, it can be realized to suppress the variation of the steering feeling irrespective of an increase or decrease in the torque distribution to the steerable wheels 14.

In the steering system 30 in the foregoing first embodiment typically shown in FIGS. 1 and 4-6, the transmission ratio R1 is altered by multiplying a transmission ratio R1 which is determined in dependence on the vehicle speed by reference to the transmission ratio decision map (FIG. 6), with a first transmission ratio alteration gain g10 which is determined in dependence on the torque distribution to the steerable wheels 14 and the non-steerable wheels 15 by reference to the first transmission ratio alteration map. Thus, it can be realized to suppress the variation of the steering feeling irrespective of the increase or decrease of the torque distribution to the steerable wheels 14. Further, the transmission ratio R1 is altered by multiplying the transmission ratio R1 which is determined in dependence on the vehicle speed by reference to the transmission ratio decision map (FIG. 6), with a second transmission ratio alteration gain g1 which is determined in dependence on the gradient in ascent traveling or descent traveling by reference to the second transmission ratio alteration map. Thus, it can be realized to suppress the variation of the steering feeling which is caused by the variation of the gradient in ascent traveling or descent traveling. In this way, in the steering system 30, it can be realized to suppress the variation of the steering feeling which is caused by the increase or decrease of the torque distribution to the steerable wheels 14 and by the variation of the gradient in ascent traveling or descent traveling, whereby it becomes possible to make the steering feeling stable.

In the steering system 30 in the foregoing first embodiment typically shown in FIGS. 1 and 7-9, the responsiveness is altered by multiplying a lead steering gain g1 which is determined in dependence on the vehicle speed by reference to the responsiveness decision map (FIG. 9), with a first responsiveness alteration gain g20 which is determined in dependence on the torque distribution to the steerable wheels 14 and the non-steerable wheels 15 by reference to the first responsiveness alteration map. Thus, it can be realized to suppress the variation of the steering feeling which is caused by the increase or decrease of the torque distribution to the steerable wheels 14. Further, the responsiveness is altered by multiplying the lead steering gain g1 which is determined in dependence on the vehicle speed by reference to the responsiveness decision map (FIG. 9), with a second responsiveness alteration gain g21 which is determined in dependence on the angle of the gradient in ascent traveling or descent traveling by reference to the second responsiveness alteration map. Thus, it can be realized to suppress the variation of the steering feeling which is caused by the gradient in ascent traveling or descent traveling. In this way, in the steering system 30, it can be realized to suppress the variation of the steering feeling which is caused by the increase or decrease of the torque distribution to the steerable wheels 14 and by the variation of the gradient in ascent traveling or descent traveling, whereby it becomes possible to make the steering feeling stable.

In the steering system 30 in the foregoing first embodiment typically shown in FIGS. 1 and 10-13, the assist force I1 is altered by multiplying a command value I1 of the assist force which is determined in dependence on the steering torque by reference to the assist force decision map (FIG. 13), with a first assist force alteration gain g40 which is determined in dependence on the torque distribution to the steerable wheels 14 and the non-steerable wheels 15 by reference to the first assist force alteration map. Thus, it can be realized to suppress the variation of the steering feeling which is caused by the increase or decrease of the torque distribution to the steerable wheels 14. Further, the assist force I1 is altered by multiplying the command value I1 of the assist force which is determined in dependence on the steering torque by reference to the assist force decision map (FIG. 13), with a second assist force alteration gain g41 which is determined in dependence on the gradient in ascent traveling or descent traveling by reference to the second assist force alteration map. Thus, it can be realized to suppress the variation of the steering feeling which is caused by the gradient in ascent traveling or descent traveling. In this way, in the steering system 30, it can be realized to suppress the variation of the steering feeling which is caused by the increase or decrease of the torque distribution to the steerable wheels 14 and by the variation of the gradient in ascent traveling or descent traveling, whereby it becomes possible to make the steering feeling stable.

Obviously, numerous other modifications and variations of the present invention are possible in light of the above teachings. It is therefore to be understood that within the scope of the appended claims, the present invention may be practiced otherwise than as specifically described herein.

What is claimed is:

1. A steering system wherein the transmission ratio of motion between a steering handle and steerable wheels is altered in dependence on the traveling state of a vehicle, the steering system comprising:
   a steering mechanical train for transmitting the motion of the steering handle to the steerable wheels at a variable transmission ratio;
   judgment means for judging whether the vehicle is in ascent traveling, descent traveling or horizontal traveling; and
   transmission ratio alteration means for altering the transmission ratio so that when the vehicle is judged by the judgment means to be in ascent traveling, the manipulation amount of the steering handle necessary to steer the steerable wheels is decreased compared with that in horizontal traveling and so that when the vehicle is judged by the judgment means to be in descent traveling, the manipulation amount of the steering handle necessary to steer the steerable wheels is increased compared with that in horizontal traveling.

2. A steering system as set forth in claim 1, further comprising:
   a transmission ratio decision map storing various transmission ratios in correlation with various vehicle speeds as representative of the traveling state;
   a transmission ratio alteration map storing various transmission alteration gains in correlation with various gradients in ascent traveling and descent traveling; and
   wherein:
   the transmission ratio alteration means is constructed to alter the transmission ratio by multiplying a transmission ratio which is determined in dependence on the vehicle speed by reference to the transmission ratio decision map, with a transmission ratio alteration gain which is determined in dependence on the gradient by reference to the transmission ratio alteration map.

3. A steering system wherein the transmission ratio of motion between a steering handle and steerable wheels is altered in dependence on the traveling state of a vehicle, the system comprising:
   a steering mechanical train for transmitting the motion of the steering handle to the steerable wheels in a variable responsiveness;
   judgment means for judging whether the vehicle is in ascent traveling, descent traveling or horizontal traveling; and
   responsiveness alteration means for controlling the steering mechanical train to alter the responsiveness of the steered angle of the steerable wheels to the manipulation amount of the steering handle; and
   wherein:
   the responsiveness alteration means operates to heighten the responsiveness compared with that in horizontal traveling of the vehicle when the vehicle is judged by the judgment means to be in ascent traveling and to lower the responsiveness compared with that in horizontal traveling of the vehicle when the vehicle is judged by the judgment means to be in descent traveling.

4. A steering system as set forth in claim 3, further comprising:
   a responsiveness decision map storing various steered angle control gains of the steerable wheels relative to the manipulation amount of the steering handle in correlation with various vehicle speeds;
   a responsiveness alteration map storing various responsiveness alteration gains in correlation with various gradients in ascent traveling and descent traveling; and
   wherein:
   the responsiveness alteration means alters the responsiveness by multiplying a steered angle control gain which is determined in dependence on the vehicle speed by reference to the responsiveness decision map, with a responsiveness alteration gain which is determined in dependence on the gradient by reference to the responsiveness alteration map.

5. A steering system wherein the assist force for the manipulation of a steering handle provided in a vehicle is altered in dependence on a steering torque applied to the steering handle, the steering system comprising:
   a steering mechanical train for transmitting the motion of the steering handle to the steerable wheels and for generating an assist force of the steering manipulation of the steering handle;
   a torque sensor for detecting a steering torque applied to the steering handle;
   judgment means for judging whether the vehicle is in ascent traveling, descent traveling or horizontal traveling;
   assist force alteration means for decreasing the assist force generated by the steering mechanical train compared with that in horizontal traveling of the vehicle when the vehicle is judged by the judgment means to be in ascent traveling and for increasing the assist force generated by the steering mechanical train compared with that in horizontal traveling of the vehicle when the vehicle is judged by the judgment means to be in descent traveling;

an assist force decision map storing various command values of the assist force in correlation with various steering torques; and an assist force alteration map storing various assist force alteration gains in correlation with various gradients in ascent traveling and descent traveling, wherein the assist force alteration means alters the assist force by multiplying a command value of the assist force which is determined in dependence on the steering torque detected by the torque sensor by reference to the assist force decision map, with an assist force alteration gain which is determined in dependence on the gradient by reference to the assist force alteration map.

6. A steering system provided in a vehicle wherein a torque transmission device alters the torque distribution of a traveling drive torque from an engine to steerable wheels and non-steerable wheels in dependence on the traveling state of the vehicle, the steering system comprising:

a steering mechanical train for transmitting a steering torque applied to a steering handle to the steerable wheels, the steering mechanical train being capable of altering the transmission ratio of the steering torque from the steering handle to the steerable wheels; and transmission ratio alteration means for controlling the steering mechanical train to alter the transmission ratio so that the manipulation amount of the steering handle necessary to steer the steerable wheels is decreased when the torque transmission device increases the distribution of the traveling drive torque to the steerable wheels, and is increased when the torque transmission device decreases the distribution of the traveling drive torque to the steerable wheels.

7. A steering system as set forth in claim 6, further comprising:

a transmission ratio decision map storing various transmission ratios in correlation with various vehicle speeds as representative of the traveling state;

a transmission ratio alteration map storing various transmission ratio alteration gains in correlation with various values of the distribution of the traveling drive torque; and wherein:

the transmission ratio alteration means alters the transmission ratio of the steering torque by multiplying a transmission ratio which is determined in dependence on the vehicle speed by reference to the transmission ratio decision map, with a transmission ratio alteration gain which is determined in dependence on the distribution of the traveling drive torque by the torque transmission device by reference to the transmission ratio alteration map.

8. A steering system provided in a vehicle wherein a torque transmission device alters the torque distribution of a traveling drive torque from an engine to steerable wheels and non-steerable wheels in dependence on the traveling state of the vehicle, the steering system comprising:

a steering mechanical train for transmitting the motion of a steering handle to the steerable wheels in a variable responsiveness; and responsiveness alteration means for controlling the steering mechanical train to alter the responsiveness of the steered angle of the steerable wheels to the manipulation amount of the steering handle in the vehicle; and wherein:

the responsiveness alteration means operates to heighten the responsiveness of the steering mechanical train when the torque transmission device increases the distribution of the traveling drive torque to the steerable wheels and to lower the responsiveness of the steering mechanical train when the torque transmission device decreases the distribution of the traveling drive torque to the steerable wheels.

9. A steering system as set forth in claim 8, further comprising:

a responsiveness decision map storing various steered angle control gains of the steerable wheels relative to the manipulation amount of the steering handle in correlation with various vehicle speeds;

a responsiveness alteration map storing various responsiveness alteration gains in correlation with various values of the distribution of the traveling drive torque; and wherein:

the responsiveness alteration means alters the responsiveness of the steering mechanical train by multiplying a steered angle control gain which is determined in dependence on the vehicle speed by reference to the responsiveness decision map, with a responsiveness alteration gain which is determined in dependence on the distribution of the traveling drive torque to the steerable wheels and the non-steerable wheels by reference to the responsiveness alteration map.

10. A steering system provided in a vehicle wherein a torque transmission device alters the torque distribution of a traveling drive torque from an engine to steerable wheels and non-steerable wheels in dependence on the traveling state of the vehicle, the steering system comprising:

a steering torque sensor for detecting a steering torque applied to a steering handle;

a steering mechanical train for transmitting the steering torque applied to the steering handle to the steerable wheels and for generating an assist force to steer the steerable wheels in dependence on the steering torque detected by the steering torque sensor, the steering mechanical train being capable of altering the assist force generated by itself; and assist force alteration means for decreasing the assist force generated by the steering mechanical train when the torque transmission device increases the distribution of the traveling drive torque to the steerable wheels and for increasing the assist force when the torque transmission device decreases the distribution of the traveling drive torque to the steerable wheels.

11. A steering system as set forth in claim 10, further comprising:

an assist force decision map storing various command values of the assist force in correlation with various steering torques;

an assist force alteration map storing various assist force alteration gains in correlation with various values of the distribution of the traveling drive torque to the steerable wheels and the non-steerable wheels; and wherein:

the assist force alteration means alters the assist force by multiplying a command value of the assist force which is determined in dependence on the steering torque detected by the steering torque sensor by reference to the assist force decision map, with an assist force alteration gain which is determined in dependence on the distribution of the traveling drive torque to the steerable wheels and the non-steerable wheels by reference to the assist force alteration map.

12. A steering system provided in a vehicle wherein a torque transmission device alters the torque distribution of a traveling drive torque from an engine to steerable wheels and non-steerable wheels in dependence on the traveling state of the vehicle, the steering system comprising:
- a steering mechanical train for transmitting the steering motion applied to a steering handle to the steerable wheels, the steering mechanical train being capable of altering the transmission ratio of the steering motion from the steering handle to the steerable wheels;
- a transmission ratio decision map storing various transmission ratios in correlation with various vehicle speeds as representative of the traveling state;
- a first transmission ratio alteration map storing various first transmission alteration gains in correlation with various values of the distribution of the traveling drive torque to the steerable wheels and the non-steerable wheels;
- a second transmission ratio alteration map storing various second transmission alteration gains in correlation with various angles of the gradient in ascent traveling and descent traveling; and
- transmission ratio alteration means for altering the transmission ratio of the steering mechanical train by multiplying a determined transmission ratio which is determined in dependence on the vehicle speed by reference to the transmission ratio decision map, with a first transmission alteration gain and a second transmission alteration gain which are determined in dependence respectively on the distribution of the traveling drive torque to the steerable wheels and the non-steerable wheels and the gradient by reference respectively to the first and second transmission ratio alteration maps; and wherein:
- the various first transmission alteration gains are set to decrease, by being multiplied with the determined transmission ratio, the manipulation amount of the steering handle necessary to steer the steerable wheels when the torque transmission device increases the distribution of the traveling drive torque to the steerable wheels and to increase, by being multiplied with the determined transmission ratio, the manipulation amount of the steering handle necessary to steer the steerable wheels when the torque transmission device decreases the distribution of the traveling drive torque to the steerable wheels; and
- the various second transmission alteration gains are set to decrease, by being multiplied with the determined transmission ratio, the manipulation amount of the steering handle necessary to steer the steerable wheels in ascent traveling and to increase, by being multiplied with the determined transmission ratio, the manipulation amount of the steering handle necessary to steer the steerable wheels in descent traveling.

13. A steering system provided in a vehicle wherein a torque transmission device alters the torque distribution of a traveling drive torque from an engine to steerable wheels and non-steerable wheels in dependence on the traveling state of the vehicle, the steering system comprising:
- a steering mechanical train for transmitting the motion of a steering handle to the steerable wheels in a variable responsiveness;
- responsiveness alteration means for controlling the steering mechanical train to alter the responsiveness of the steered angle of the steerable wheels to the manipulation amount of the steering handle;
- a responsiveness decision map storing various steered angle control gains of the steerable wheels relative to the manipulation amount of the steering handle in correlation with various vehicle speeds;
- a first responsiveness alteration map storing various first responsiveness alteration gains in correlation with various values of the distribution of the traveling drive torque to the steerable wheels and the non-steerable wheels, the various first responsiveness alteration gains being set to become large as the distribution of the traveling drive torque to the steerable wheels is increased;
- a second responsiveness alteration map storing various second responsiveness alteration gains in correlation with various gradients in ascent traveling and descent traveling, the various second responsiveness alteration gains being set to become larger as the angle of the gradient in ascend traveling increases and to become smaller as the angle of the gradient in descend traveling increases; and
- responsiveness alteration means for altering the responsiveness of the steering mechanical train by multiplying a responsiveness alteration gain which is determined in dependence on the vehicle speed by reference to the responsiveness decision map, with a first responsiveness alteration gain and a second responsiveness alteration gain which are determined in dependence respectively on the distribution of the traveling drive torque to the steerable wheels and the non-steerable wheels and the gradient by reference respectively to the first and second responsiveness alteration maps.

14. A steering system provided in a vehicle wherein a torque transmission device alters the torque distribution of a traveling drive torque from an engine to steerable wheels and non-steerable wheels in dependence on the traveling state of the vehicle, the steering system comprising:
- a steering torque sensor for detecting a steering torque applied to a steering handle;
- a steering mechanical train for transmitting the steering torque applied to the steering handle to the steerable wheels and for generating an assist force to steer the steerable wheels in dependence on the steering torque detected by the steering torque sensor, the steering mechanical train being capable of altering the assist force generated by itself;
- an assist force decision map storing various command values of the assist force in correlation with various steering torques applied to the steering handle;
- a first assist force alteration map storing various first assist force alteration gains in correlation with various values of the distribution of the traveling drive torque to the steerable wheels and the non-steerable wheels, the various first assist force alteration gains being set to become smaller as the distribution of the traveling drive torque to the steerable wheels is increased;
- a second assist force alteration map storing various second assist force alteration gains in correlation with various gradients in ascent traveling and descent traveling, the various second assist force alteration gains being set to become smaller gradually as the angle of the gradient in ascend traveling increases and to become larger gradually as the angle of the gradient in descend traveling increases; and
- assist force alteration means for altering the assist force generated by the steering mechanical train by multiplying a command value of the assist force which is determined in dependence on the steering torque detected by the torque sensor by reference to the assist force decision map, with a first assist force alteration gain and a second assist force alteration gain which are determined in dependence respectively on the distribution of the traveling drive torque to the steerable wheels and the non-steerable wheels and the angle of the gradient by reference respectively to the first and second assist force alteration maps.

* * * * *